United States Patent

Cooke et al.

[11] Patent Number: 6,041,678
[45] Date of Patent: Mar. 28, 2000

[54] TWIN MASS FLYWHEEL

[75] Inventors: Richard David Maitland Cooke, Warwick; Anthony John Curtis, Leamington Spa; John Francis Fitzpatrick-Ellis, Warwick; Robert John Murphy; Peter Webster, both of Leamington Spa, all of United Kingdom

[73] Assignee: Automotive Products, PLC, Leamington Spa, United Kingdom

[21] Appl. No.: 08/619,712

[22] Filed: Mar. 28, 1996

[30] Foreign Application Priority Data

Aug. 20, 1994 [GB] United Kingdom ............... 9416891
May 7, 1995 [GB] United Kingdom ............... 9510845

[51] Int. Cl.⁷ ........................................ F16F 15/10
[52] U.S. Cl. .......................... 74/574; 74/572; 464/68; 192/30 V
[58] Field of Search ................... 74/572, 573 R, 74/574; 464/68; 192/30 V

[56] References Cited

U.S. PATENT DOCUMENTS

| | | | |
|---|---|---|---|
| 1,641,230 | 9/1927 | Manville | 74/574 |
| 1,716,225 | 6/1929 | Georgevitch | 74/572 |
| 2,653,457 | 9/1953 | Guernsey et al. | 74/574 |
| 4,727,970 | 3/1988 | Reik et al. | 74/574 |
| 4,767,380 | 8/1988 | Chasseguet et al. | 464/68 |
| 4,813,295 | 3/1989 | Drexl et al. | 74/572 |
| 4,850,932 | 7/1989 | Kagiyama et al. | 464/68 |
| 5,025,680 | 6/1991 | Umeyama et al. | 74/574 |
| 5,349,882 | 9/1994 | Kamio | 74/572 |
| 5,557,984 | 9/1996 | Cooke et al. | 74/574 |

FOREIGN PATENT DOCUMENTS

| | | | |
|---|---|---|---|
| 2229793 | 8/1991 | United Kingdom | 74/574 |
| 2254906 | 10/1992 | United Kingdom | 74/574 |

*Primary Examiner*—Vinh T. Luong
*Attorney, Agent, or Firm*—Paul E Milliken; Lee A Germain

[57] ABSTRACT

A twin mass flywheel (10) in which two co-axially arranged flywheel masses (11,12) are mounted for limited angular rotation relative to each other and a plurality of pivotal linkages (40) interconnect the two flywheel masses. Each linkage comprises a first link (41) pivotally connected (43) to one (12) of the flywheel masses, a second link (42) pivotally connected (44) to the other (11) of the flywheel masses, and a pivot (45) for pivotally connecting the first and second links. A resilient member in the form of an elastomeric torsion unit (46) or spring (36) is associated with the pivotal connection (44) of at least one link (42) with its associated flywheel (11) for controlling the relative rotation of said flywheel masses (11, 12).

27 Claims, 19 Drawing Sheets

TORSION UNIT EFFECT

LINKAGE EFFECT (OFFSET BOBWEIGHT)

TWIN MASS FLYWHEEL

FIELD OF THE INVENTION

The present invention relates to a twin mass flywheel arrangement for transmitting torque and absorbing or compensating for torsional vibrations such as can arise in a vehicle transmission assembly.

More particularly, the invention relates to a twin mass flywheel of the type described in patent GB2254906 in which two coaxial flywheel masses are mounted for limited angular rotation relative to each other; and a plurality of pivotal linkages interconnect the two flywheel masses each pivotal linkage comprising a first link pivotally connected to one of the flywheel masses, and a second link pivotally connected to the other of the flywheel masses, and means for pivotally connecting the first and second links.

SUMMARY OF THE INVENTION

It is an object of the present invention to provide an improved form of the above type of twin mass flywheel.

Thus according to the present invention there is provided a twin mass flywheel comprising two co-axially arranged flywheel masses which are mounted for limited angular rotation relative to each other; and a plurality of pivotal linkages interconnecting the two flywheel masses, each linkage comprising a first link pivotally connected to one of the flywheel masses, a second link pivotally connected to the other of the flywheel masses, and a pivot for pivotally connecting the first and second links characterised in that associated with the pivotal connection of at least one link with its associated flywheel there is a resilient means for controlling the relative rotation of said flywheel masses.

Typically the resilient means will control a substantial part (if not all) of the relative rotation of the flywheel masses.

The resilient means may undergo radial torsion (as hereinafter described) or it may undergo axial torsion (as hereinafter described).

One of the links may be directly connected to the resilient means.

In a preferred arrangement the resilient means is an elastomeric material.

The resilient means may be a spring.

BRIEF DESCRIPTION OF THE DRAWINGS

Embodiments of the present invention shall now be described by way of example only, with reference to the accompanying drawings in which.

DESCRIPTION OF THE PREFERRED EMBODIMENTS

Figure 1:
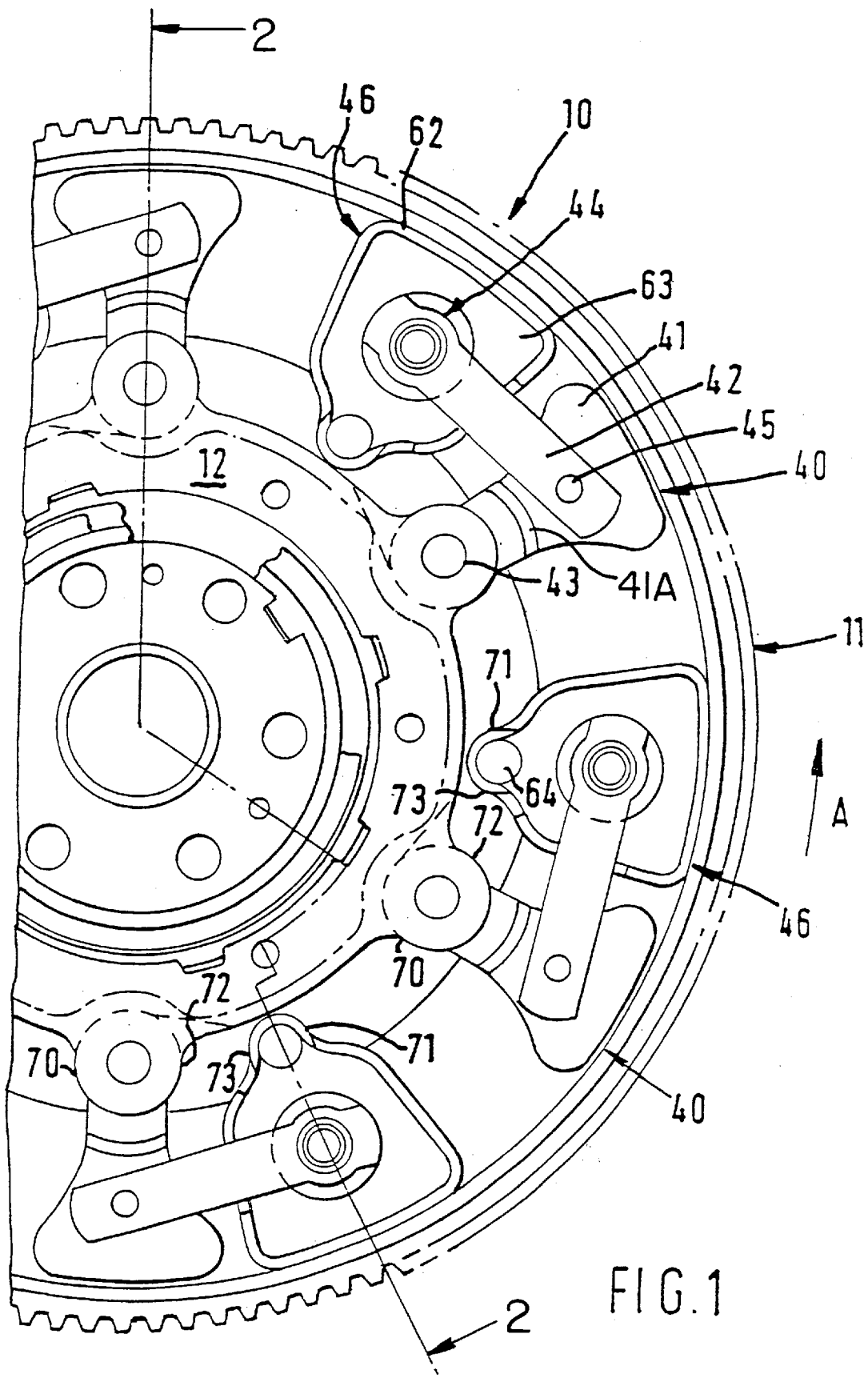
FIG. 1 is an axial cutaway view of a twin mass flywheel according to the present invention in its geometrically neutral position, taken in direction B of FIG. 2.
Figure 2:
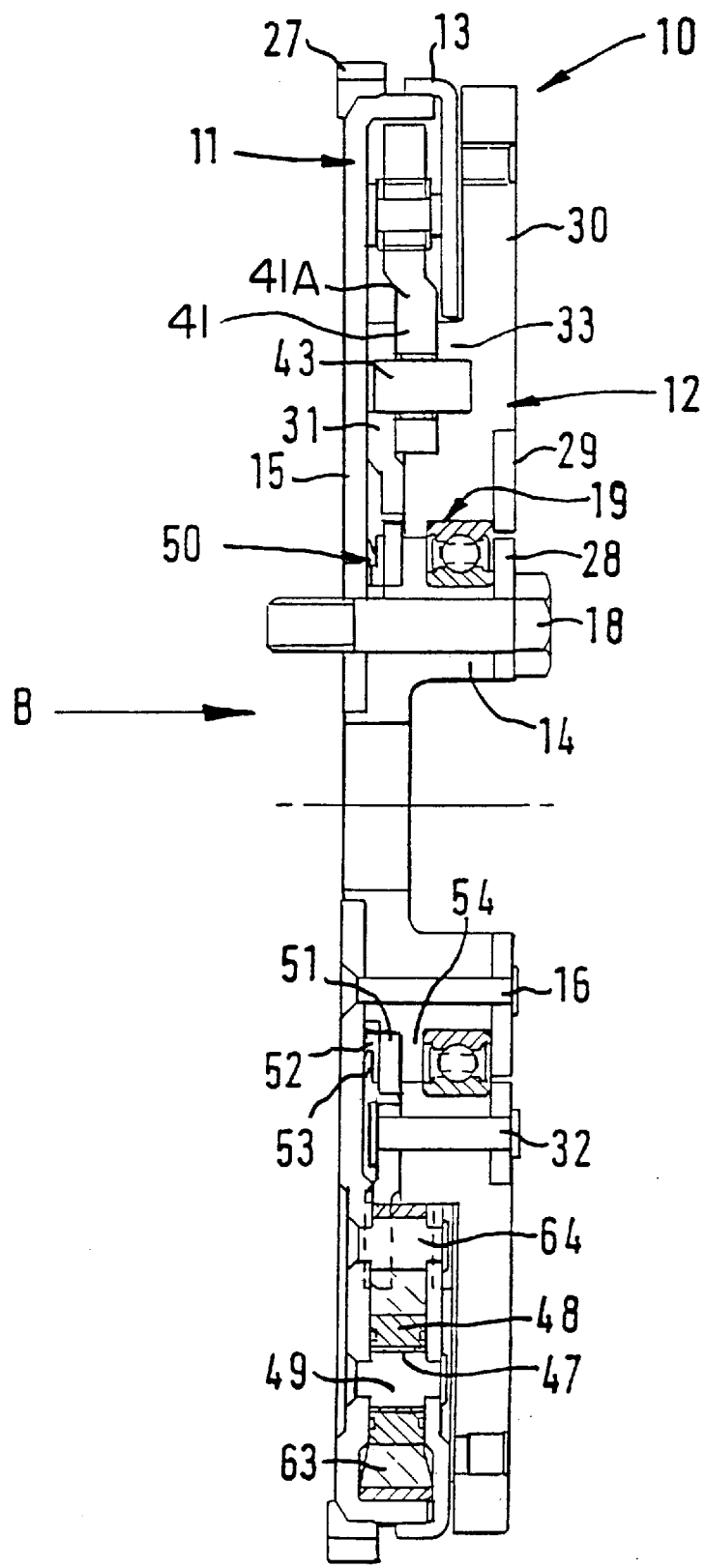
FIG. 2 is a radial cross section taken along the line 2—2 of FIG. 1.

With reference to FIGS. 1 to 2 of the accompanying drawings there is illustrated a twin mass flywheel 10 which is divided into two flywheel masses 11 and 12. One flywheel mass 11 is fixed on a crankshaft (not shown) of an internal combustion engine by way of a central hub 14 and bolts 18. In use a friction clutch (not shown) is secured to the second flywheel mass 12. Under normal drive and over-run conditions the twin mass flywheel 10 rotates in an anticlockwise direction as viewed in FIG. 1 as shown by arrow A.

The flywheel mass 11 comprises a central hub 14, a main housing plate 15, a cover plate 13 and a starter ring 27 which is welded to main housing plate 15. An inner bearing retaining plate 28 is fixed to the hub 14 by rivets 16 to retain a bearing 19 on which the second flywheel mass 12 is mounted.

The second flywheel mass 12 comprises a flywheel plate 30 with an outer bearing retaining plate 29 and a pivot plate 31 both fixed to the flywheel plate 30 by rivets 32.

Relative rotation between the two flywheel masses 11 and 12 is controlled by a plurality of pivotal linkages 40, a plurality of torsion units 46, and by friction damping means 50.

In the embodiment shown in FIG. 1 there are 6 pivotal linkages 40 but this number can be varied to suit each application. Each pivotal linkage 40 comprises a first link 41 pivotally mounted between a centre hub portion 33 of the flywheel mass 12 and pivot plate 31 on a plain bearing 47 by way of a pivot 43 and a second link 42 pivotally mounted on the flywheel mass 11 by way of pivot 44 via a torsion unit 46. The two links 41 and 42 are pivotally connected to each other by means of a third pivot 45. It will be noted from FIG. 1 that the pivot 43 is positioned radially inwardly of the pivots 44 and 45. The first link 41 is formed as a bob weight mass having a greater mass at its end remote from the pivot 43. The second link 42 comprises a pair of parallel arms 42A, 42B (see FIG. 1A) which are axially spaced one on each side of the link 41.

Preferably there is one torsion unit 46 per pivotal linkage 40 but there could be more than one or none at all depending on the application.

Each torsion unit 46 (see FIG. 1A) comprises a central metal insert 48 an outer sheet metal housing 62 and a body of elastomeric material 63 a first surface of which is bonded to the housing 62 and a second surface of which is bonded to the insert 48.

Typically the elastomeric material (63 or 163,260,460,560 see below) may be Ethelene propolene diene mononer (E.P.D.M) or hydrogenated nitrile butile rubber (H.N.B.R) and its hardness may be in the range 70 degrees to 80 degrees Shore hardness A scale, but not necessarily limited to the above materials or the above hardness range.

Each torsion unit is clamped between the main housing plate 15 and housing cover plate 13 by rivets 49 (See FIG. 2) which form pivots 44 and by radially inward stop rivets 64. Each insert 48 is supported relative to the associated rivet 49 on a plain bearing 47 to allow limited rotation relative to the housing 62 by deformation of the elastomeric material 63.

Figure 1A:
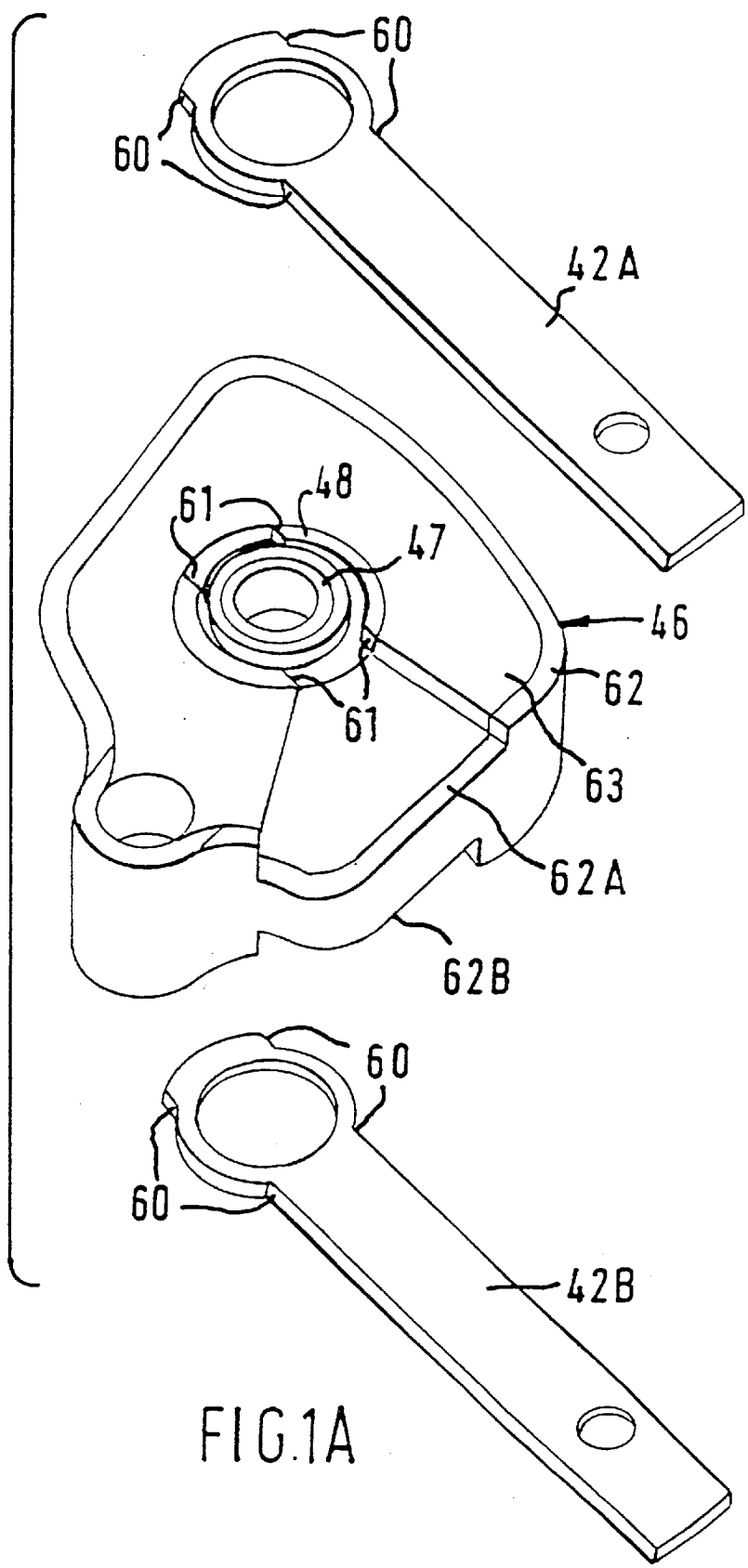
FIG. 1a is an exploded perspective view of a torsion unit and associated links.

This rotation of the inserts is effected by the pivoting of the associated link pairs 42A, 42B by recessing the ends of the inserts 48 as shown in FIG. 1A to provide abutments 61 which are contacted by cooperating abutments 60 on the associated ends of the links 42A,42B.

As will be appreciated, relative rotation of the flywheel mass 11,12 results in pivoting of link pairs 42A, 42B on their associated pivots 49 which rotates the inserts 48. This loads the elastomeric material in torsion thus controlling the relative rotation of the flywheel mass.

Note that since the first and second bonded surfaces of the elastomeric material are radially separated, when the insert 48 rotates relative to the housing 62 the elastomeric material 63 undergoes radial shear i.e. the first and second bonded surfaces of the elastomeric material which rotate relative to each other are spaced radially apart.

Each torsion unit housing 62 has two axial recesses 62A,62B which allow the pivoting movement of arms 42A and 42B to be accommodated so that arm 42A, 42B can be spaced closer together to facilitate the construction of a compact unit.

The radially outermost portion of first link 41 is axially displaced from the radially innermost portion of first link 41, (i.e. it has an axial joggle 41A) to facilitate the construction of a compact unit. Alternatively a straight non-joggled construction may be used.

All the linkage components and associated pivots and torsion units are contained radially and axially within the main housing plate 15 and cover plate 13, to ensure debris is contained in the event of failure of the elastomeric material.

The friction damping means 50 (see FIG. 2 and 3) includes an annular friction plate 51 having lugs 55 which engage slots 56 in pivot plate 31 so that friction plate 51 is rotationally fast but axially slidable on the pivot plate 31. The friction damping means 50 also includes an annular pressure plate 52 having lug 57 which engages slot 58 in central hub 14 (so that the plate 52 is rotationally fast, but axially slidable on the central hub 14) which is biased by belleville spring 53 into frictional contact with friction plate 51 between the main housing plate 15 and an abutment 54 on the central hub 14. As will be appreciated, friction damping means 50 damps any rotational movement of the flywheel masses 11 and 12 relative to each other.

Operation of the twin mass flywheel shown in FIGS. 1 to 3 will now be described. Under no-load conditions with the clutch disengaged, centrifugal force acts on the pivotal linkages 40 and particularly on the first links 41 and urges the linkages in a radially outward direction. At higher rotational speeds the centrifugal force is greater and whilst this does not affect the configuration under no-load conditions it greatly affects the force required to move the flywheel mass 12 relative to the flywheel mass 11 i.e. the flywheel torsional stiffness.

Figure 5:
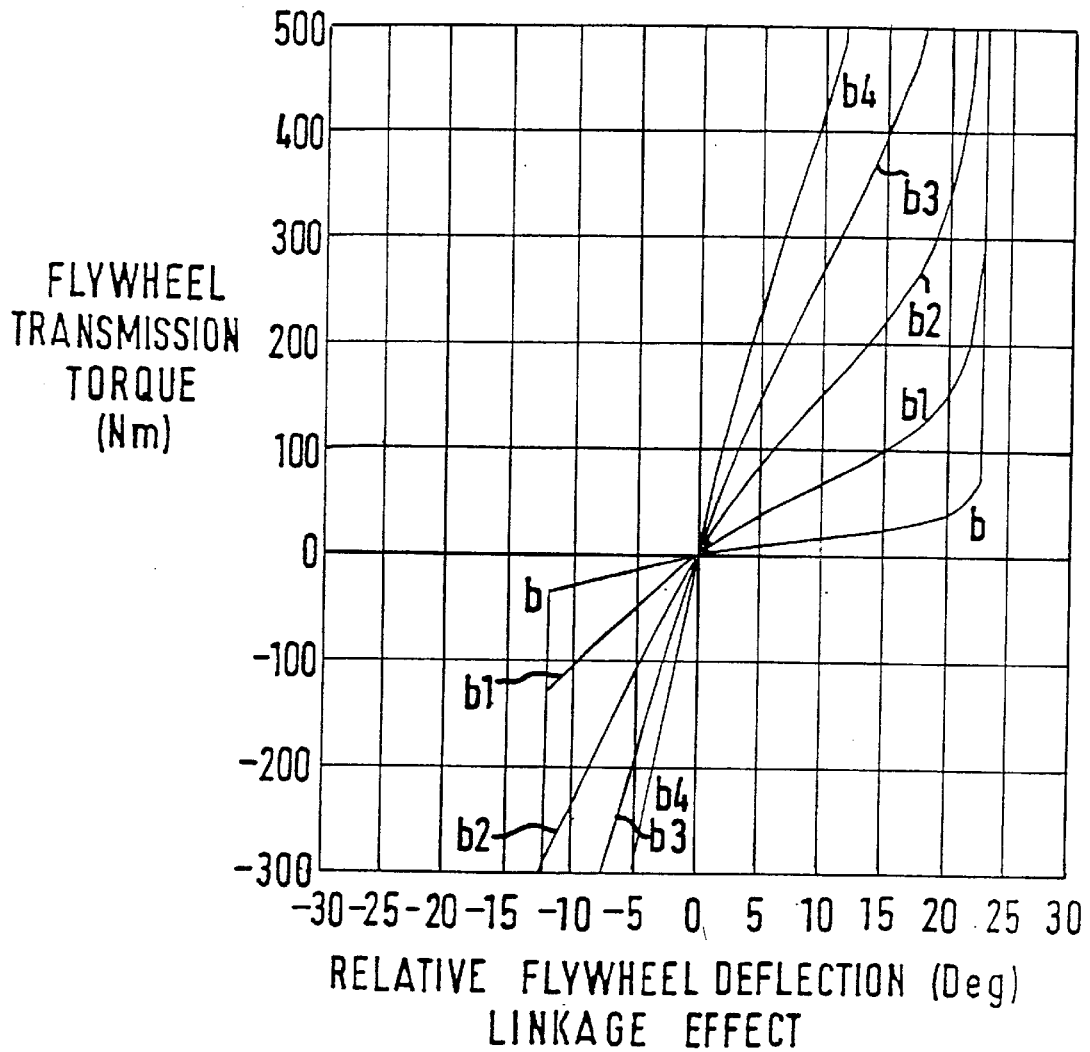
FIG. 5 illustrates relative flywheel deflection Versus flywheel transmission torque characteristics of the flywheel connecting linkage used in the twin mass flywheel of FIG. 1 for different rotational speeds (b, b1, b2, b3, b4 represent flywheel rotational speeds of 800, 1600, 2400, 3200 and 4000 rpm respectively)

If the clutch is engaged and power is transmitted in the drive direction from flywheel mass 11 to flywheel mass 12 (ie. flywheel mass 11 rotates anticlockwise relative to flywheel mass 12 when viewing FIG. 1) there is a tendency for the two masses to rotate relative to each other. At relatively low speeds when the influence of centrifugal force is smaller the flywheel masses move readily relative to each other i.e. the flywheel torsional stiffness is relatively low. However at relatively high speeds the influence of centrifugal force is much greater and relative rotation of the flywheel masses requires greater force i.e. the flywheel torsional stiffness is relatively high. The controlling effect of the linkage on the relative rotation of the flywheel masses is shown in FIG. 5 and is speed sensitive. Curves b,b1,b2,b3 and b4 in FIG. 5 represent the deflection versus torque characteristic for flywheel rotational speeds of 500, 1600, 2400, 3200 and 4000 rpm respectively.

Figure 3:
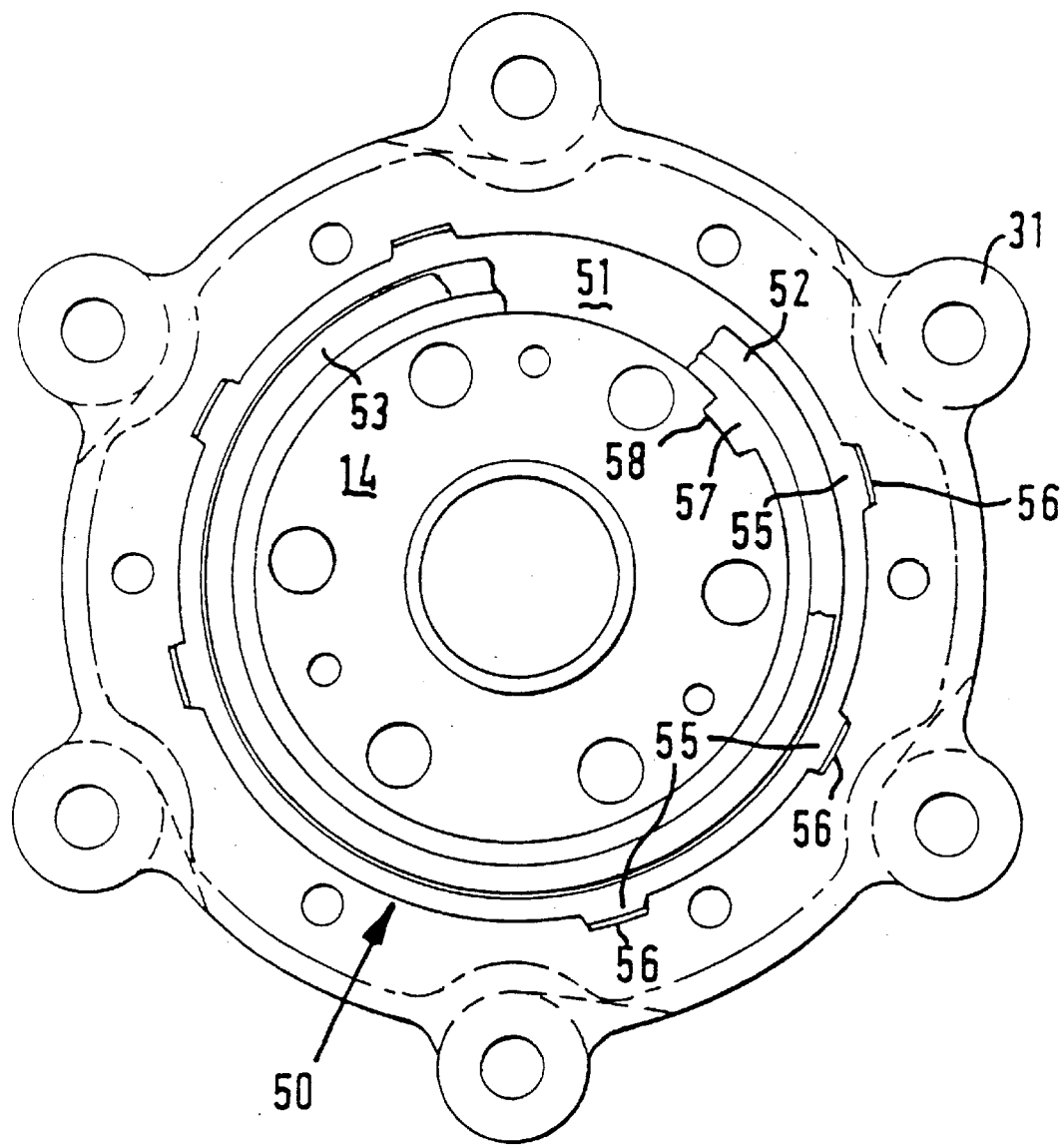
FIG. 3 is a partial axial view in the direction B of FIG. 2.

If the clutch is engaged and power is transmitted in the over-run direction from flywheel mass 12 to flywheel mass 11 (ie. flywheel mass 11 rotates clockwise relative to flywheel mass 12 when viewing FIG. 1) the effects are similar to the above except that in the embodiments shown in FIGS. 1 to 3 the first link 41 folds under the second link 42.

Under conditions of low rotational speed and high torque in the drive direction, relative rotation between flywheel mass 11 and 12 occur until first abutments 70 on flywheel mass 12 contacts second abutments 71 on the torsion unit housing 62. The abutments 70,71 act as drive end stops to limit further relative rotation of the flywheel masses 11,12.

Under conditions of low rotational speed and high torque in the overrun direction, relative rotation between flywheel mass 11 & 12 occur until first abutments 72 on flywheel mass 12 contacts second abutments 73 on the torsion unit housing 62. The first and second abutments 72, 73 act as over-run end stops to limit further relative rotation of the flywheel masses 11, 12.

The first and second abutments 70,71 and 72, 73 are arranged such that pivots 44,45, and 43 do not become aligned. The effect of these drive and over-run end stops can be seen in FIG. 5, and are represented by the vertical lines at +22.5 and −12 degrees respectively of relative flywheel deflection.

The controlling effect of the torsion unit (see FIG. 4) is not dependant upon the speed of rotation of the twin mass flywheel but is dependant upon the geometry of the pivotal linkages 40, the shape of the torsion unit and the elastomeric material.

With each pivotal linkage 40 in its geometrically neutral position (see FIG. 1) i.e. with pivots 45 and 43 of each linkage aligned on a radial plane of the twin mass flywheel 10, the pivot 45 is at its most radially outward position and hence the second link 42 is also at its radially outermost position. Any relative rotation of the flywheel masses 11 and 12 in either the drive or over-run directions will move the pivot 45 substantially radially inwards thus the second link 42 and torsion unit insert 48 will rotate relative to the torsion unit housing 62.

If the twin mass flywheel 10 is assembled such that the torsion units 46 do not rotationally bias the links 42 in any rotational direction about the associated pivot axes (i.e. each torsion unit is in its torsionally neutral position) when the pivotal linkage 40 is in its geometrically neutral position, then any relative rotation of flywheel masses 11 and 12 away from this position in the drive or over-run direction causes the torsion unit 46 to exert a restoring force which endeavours to return the linkage 40 to its geometrical neutral position. The controlling effect of this restoring force on the relative rotation of the flywheel masses is shown in FIG. 4 line a.

Figure 4:
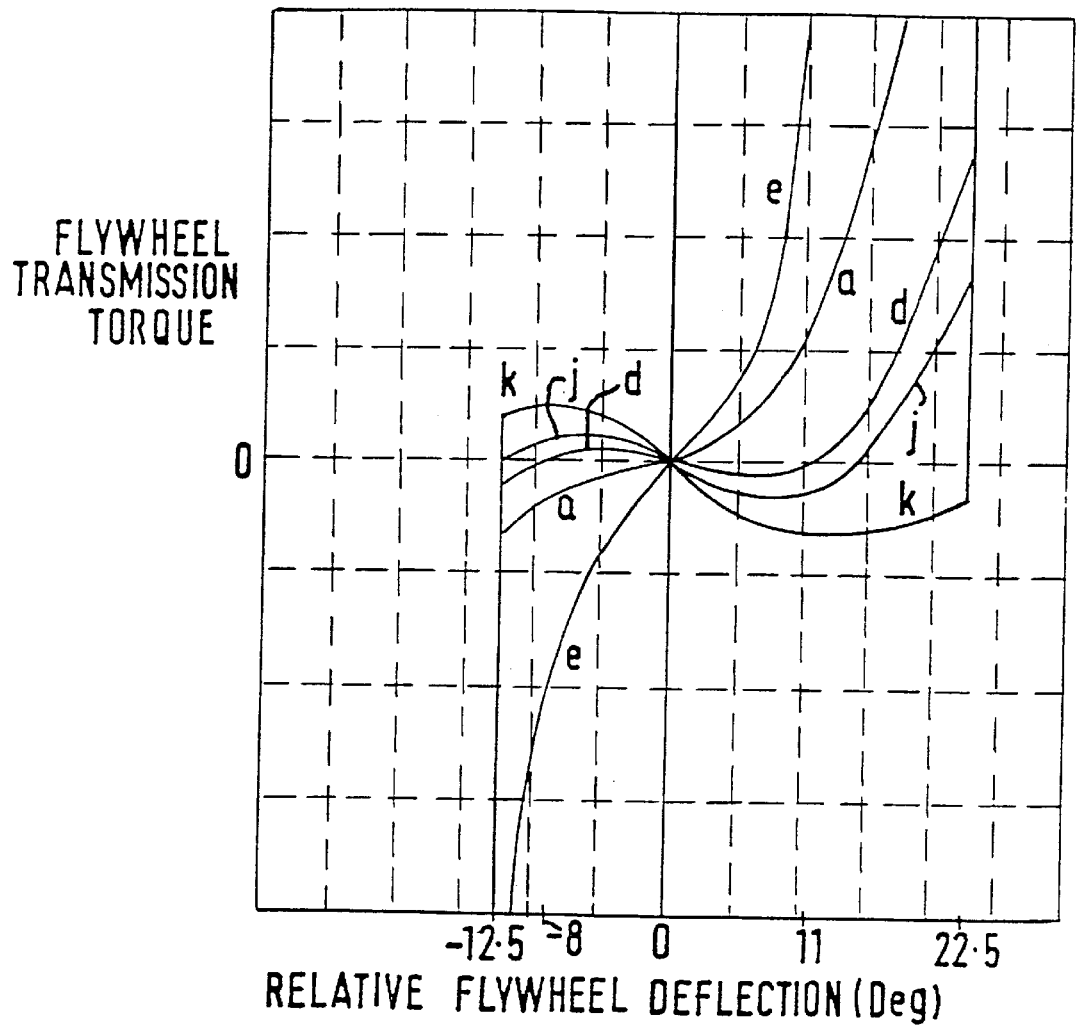
FIG. 4 illustrates relative flywheel deflection Versus flywheel transmission torque characteristics of various torsion units which can be used in the twin mass flywheel of FIG. 1.
Figure 6:
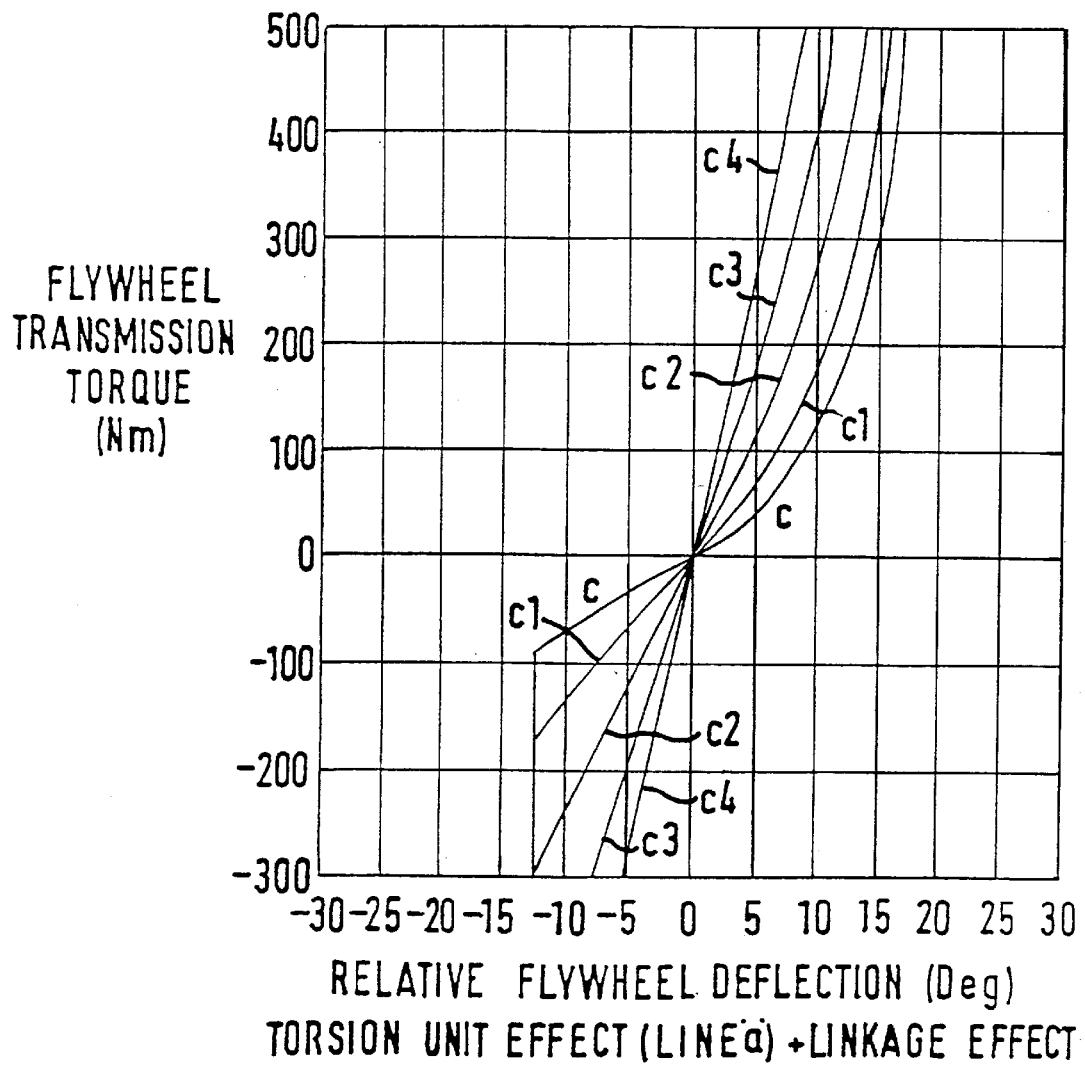
FIG. 6 illustrates relative flywheel deflections Versus flywheel transmission torque characteristics for different rotational speeds of one particular form of the twin mass flywheel of FIG. 1 (C, C1, C2, C3, C4 represent flywheel rotational speeds of 800, 1600, 2400, 3200 and 4000 rpm respectively)

The controlling effect of the torsion unit 46 is additive to the controlling effect of the linkage 40 at any particular speed, thus the characteristic of the twin mass flywheel 10 at say 800 rpm is FIG. 4 line a plus FIG. 5 line b giving FIG. 6 line c. In this case the torsional stiffness of the twin mass flywheel 10 has been increased throughout the range of relative flywheel rotation when compared with the torsional stiffness of the linkages 40.

The twin mass flywheel 10 can also be assembled such that when the pivotal linkage 40 is in its geometrically neutral position the torsion unit 46 biases the second linkage 42 in a clockwise or anti-clockwise direction about its associated pivotal axis as viewed in FIG. 1.

This is achieved by rotating the torsion unit insert 48 clockwise or anticlockwise relative to the torsion unit housing 62 (as viewed in FIG. 1) prior to bonding together the torsion unit insert and torsion unit housing with the elastomeric material. FIG. 4 lines d,j & k show the effects of such and clockwise rotation of the insert whilst line e shows the effect of an anti clockwise rotation.

In the first arrangement (see FIG. 4 line d) when the second link 42 is biased clockwise as viewed in FIG. 1 by the torsion unit when the linkage is in its geometrically neutral position, there are three flywheel deflection positions where the torsion unit effect is zero, i.e. at −8, 0, and +11 degrees (i.e. the positions at which line d crosses the zero torque axis of FIG. 4). This comes about because at −8 and +11 degrees of relative flywheel rotation the torsion unit is in its torsionally neutral position (i.e. is not biasing the link 42 either clockwise or anticlockwise) and at 0 degrees whilst the torsion unit is biasing the link 42 clockwise as viewed in FIG. 1, the linkage is in a dead centre position (i.e. pivots 45 and 43 are aligned on a radial plane of the twin mass flywheel 10).

Figure 7:
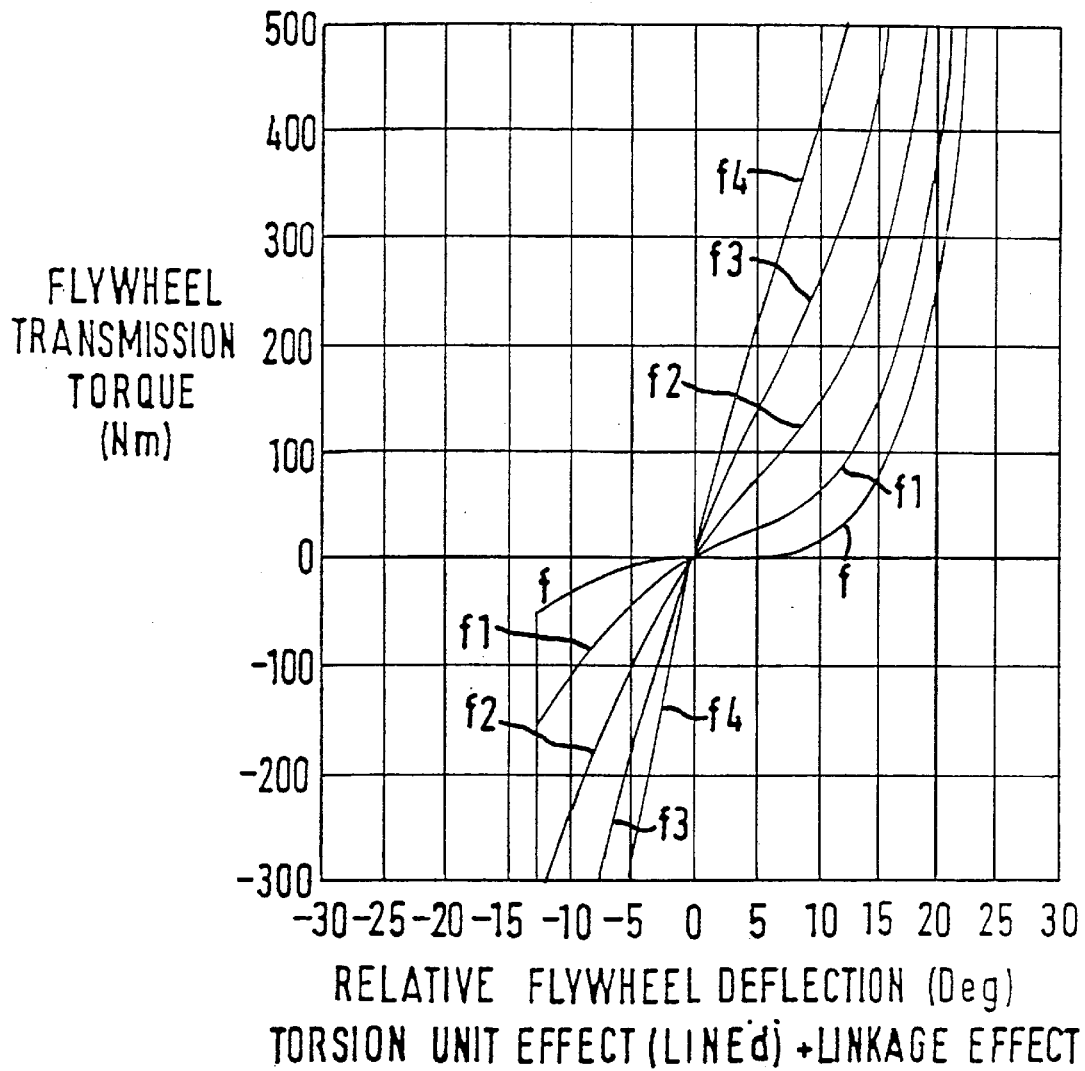
FIG. 7 illustrates relative flywheel deflections Versus flywheel transmission torque characteristics for different rotational speeds of a modified form of the twin mass flywheel of FIG. 1 (F, F1, F2, F3, F4, represent flywheel rotational speeds of 800, 1600, 2400, 3200 and 4000 rpm respectively)

When this curve (FIG. 4 line d) is added to the curves in FIG. 5 to give the curves in FIG. 7 it has the effect of producing flatter low range deflection curves whilst still maintaining the flywheel stiffness near the end stop positions. This is best demonstrated by comparing FIG. 6 line c with FIG. 7 line f.

FIG. 4 line j shows a characteristic of a further arrangement where at −12.5, 0, and +14 degrees the effect of the torsion unit is zero. FIG. 4 line k shows a characteristic of an arrangement in which still further the amount of insert rotation is such that there is only one flywheel deflection position (0 degrees) within the working range of flywheel deflections where the effect of the torsion unit is zero. This is because at the end stop positions of the flywheel masses the torsion unit has still not reached its torsionally neutral position.

It can be of particular benefit to adopt a twin mass flywheel characteristic shown in FIG. 7 which, at low engine speeds, has low torsional stiffness (i.e. low gradient of graph lines f, f1,f2,etc) at small deflection angles to cure phenomena such as engine induced gear rattle at idle speed, but which has high torsional stiffness (i.e. high gradient of graph lines f,f1,f2,etc) when the linkage approaches its end stop position to minimise or eliminate end stop rattle.

The twin mass flywheel construction described above in relation to FIGS. 1 to 3 have the following benefits:

a) The torsion unit 46 can be designed to control relative movement of the flywheel masses over their whole range of angular movement without over stressing the elastomeric material 63 and causing failure. This is possible because the angular range of movement of the second link 42 relative to its associated flywheel mass 11 (33 degrees) during the entire angular movement of the flywheel masses is far less that the range of movement between the first link 41 and second link 42 (97 degrees) over the same angular movement of the masses and thus the torsion unit 46 can be designed to articulate over the whole of this 33 degree range of movement.

b) The elastomeric material 63 used as the resilient means in a torsion unit has a non-linear and increasing torque versus deflection characteristic i.e. the torque required to deflect the insert say 10 degrees relative to the housing is more than double the torque required to rotate the insert 5 degrees. Also this stiffness is dependant upon, and increases with the frequency of application of torque. The torsion unit also has hysteresis which damps fluctuation in input torque from the engine. This hysteresis is also dependant upon, and increases with the frequency of application of torque. These characteristics can be of particular benefit in damping relative flywheel rotation especially during start-up of a vehicle engine.

c) By positioning the resilient means at the pivotal connection of either linkage with its associated flywheel mass (rather than at the pivotal connection of the first and second link) it allows the links (in particular link 41) to have a greater mass since the elastomeric material is less dense than the link material. This produces a greater centrifugal/speed dependent control force.

d) When the torsion unit 46 is mounted on the flywheel mass the size of the elastomeric bush is no longer limited by having to be housed in one of the links 41 or 42. The elastomeric material in a larger torsion unit is less stressed per degree of torsional deflection than the elastomeric material in a smaller torsion unit.

e) The elastomeric material is stressed in torsion only. The expansion coefficient of the torsion unit housing and insert is greater than that of the elastomeric material. The bonding of the elastomeric material to the torsion unit housing and insert takes place at elevated temperature thus when cool the elastomeric material is in tension. To optimise the life of a torsion unit which is to experience torque and tensile and compressive forces the insert has to be mechanically expanded to relieve the residual stresses. However, when the torsion unit is to experience torsional loads only, this additional operation is not required.

f) With the greater degree of control over relative flywheel mass rotation, cushioned end stops are no longer required since the force and frequency of impact when the end stops are used is less.

g) It can also be advantageous to be able to produce several twin mass flywheel torsional stiffness characteristics from the same or similar components. The torsion unit characteristics can be modified by using different grades of elastomeric material or manufacturing the torsion unit with voids in the elastomeric material, or changing the cross section of the elastomeric material or by manufacturing the abutments 60 and 61 such that the second link 42 can rotate by a limited amount prior to the torsion unit insert 48 beginning to rotate (i.e. to produce lost motion between the torsion unit insert 48 and the second link 42).

As indicated above the overall characteristics of the twin mass flywheel 10 can be changed by changing the individual torsion unit characteristics. However, the torsion units need not be the same. Thus, for example, with only two types of torsion unit with different characteristics x and y and a twin mass flywheel with six linkages each with one torsion unit a total of five balanced twin mass flywheel characteristics can be achieved (eg. using 6x or 6y or 3x and 3y or 2x and 4y or 4x and 2y). Thus by manufacturing only a small number of different torsion units the twin mass flywheel can be optimised for several different applications thus making savings on part numbers and inventory costs.

Figure 8:
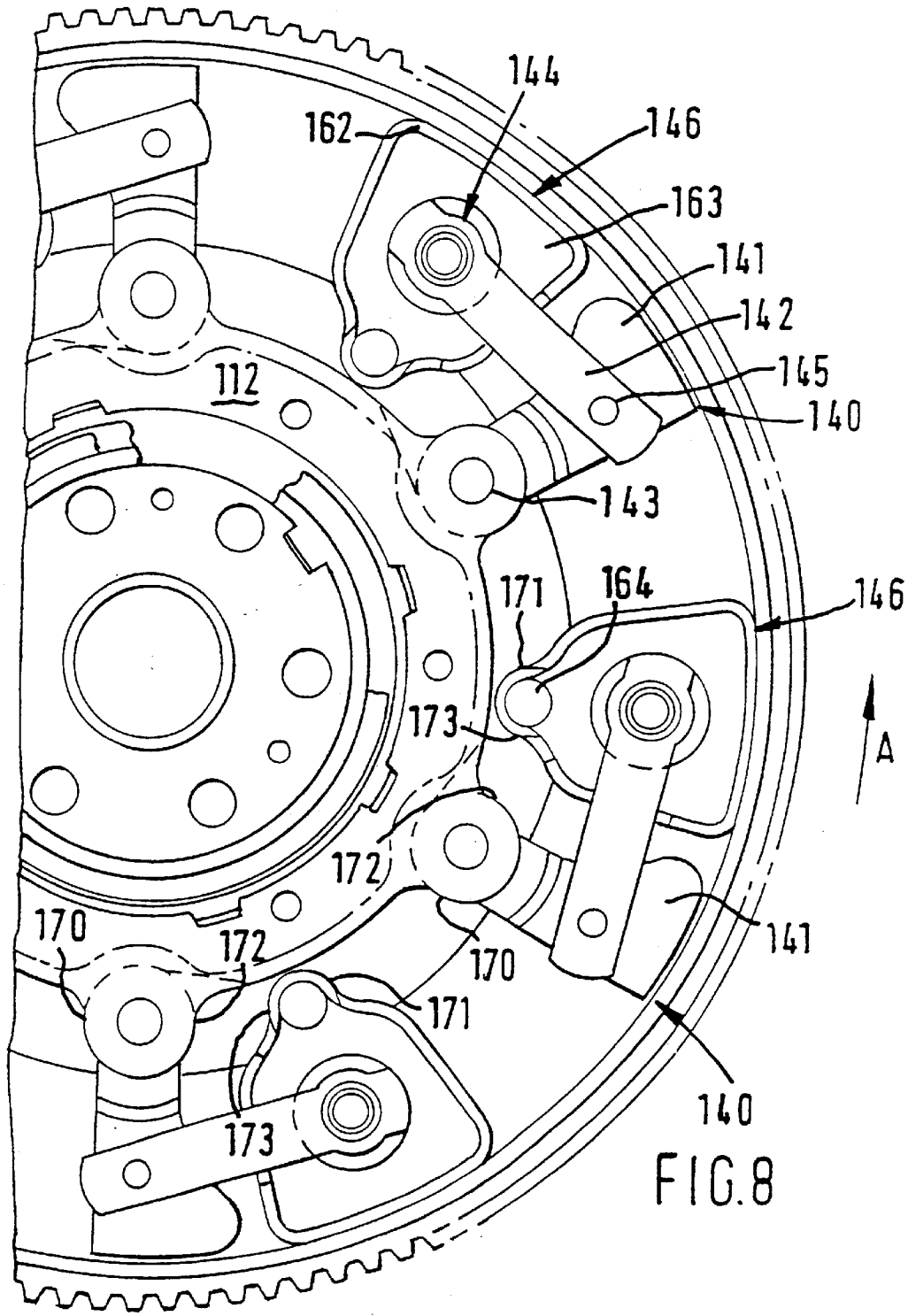
FIG. 8 is an axial cut-away view taken in the same direction as FIG. 1 of a second embodiment of a twin mass flywheel according to the present invention.

FIG. 8 shows a second embodiment of a twin mass flywheel similar to the twin mass flywheel 10 of FIG. 1 in which similar components have been numbered with the reference number used in FIG. 1 increased by 100. The difference from the FIG. 1 construction is that the links 141 are not circumferentially symmetrical (i.e. the centres of mass of the links does not lie on a line journey pivots 143 and 145). Torsion units 146 have the same deflection versus torque characteristic as represented by FIG. 4 line d. The effect of the circumferentially asymmetrical links can be of particular benefit when used in conjunction with torsion units.

The centrifugally neutral position of an asymmetrical link (i.e. the linkage position adopted when the flywheel is rotating and transmitting zero torque) is generally not the same as the geometrically neutral position due to the offset between the centre of mass of the links 41 and 141. This has the effect of displacing the torque versus deflection graph to the left (see FIG. 9) compared with the equivalent graph (FIG. 5) for symmetrical links.

The torsion unit influence is independent of the link asymmetry and thus there is no change in the behaviour of the torsion units which still follow the characteristic shown graphically in FIG. 4 line d. This has the particularly advantageous effect of being able to shift the linkage characteristic and torsion unit characteristics relative to each other to produce different total characteristics to more easily optimise the characteristics for a particular application. FIG. 10 shows total characteristics built up by the addition of the linkage characteristics g–g4 of FIG. 9 with the torsion unit characteristics d of FIG. 4. In a further embodiment at least one of the arms 42A,42B could be made integral with the metal insert 48 but without the elastomeric material being bonded directly to the integral arm in which case the integral arm would, via the integral insert, be bonded to the elastomeric material.

Figure 11:
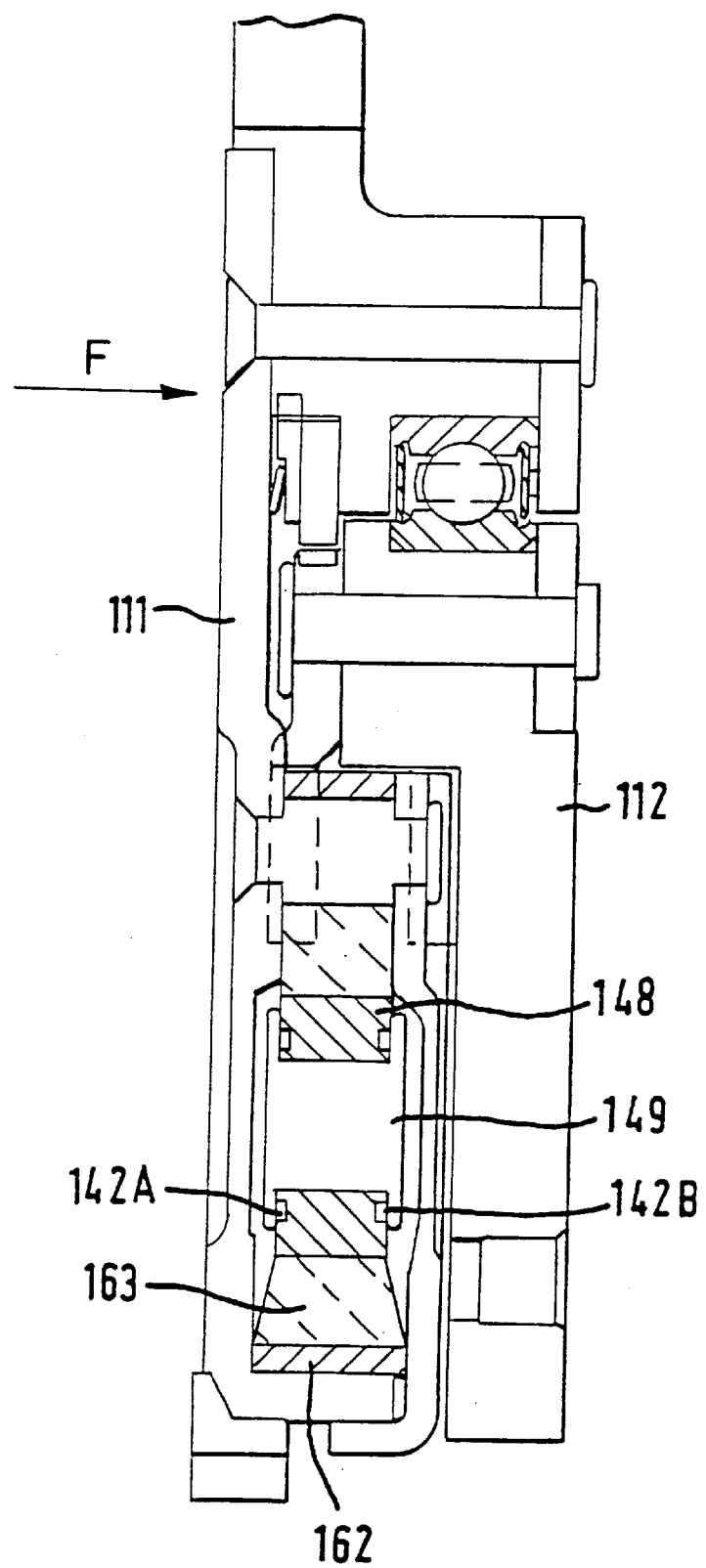
FIG. 11 is a radial cross sectional view taken along line 11—11 of FIG. 20.

FIG. 11 shows a further embodiment of a twin mass flywheel similar to the twin mass flywheel 10 of FIG. 1 in which similar components have again been numbered with reference numerals used in FIG. 1 increased by 100. In FIG. 11 rivets 149 only clamps arms 142A and 142B to the torsion unit insert 148. This allows limited radial and circumferential movement of the rivet 149 relative to the torsion unit housing 162. Whilst this embodiment puts additional tensile and compressive stresses into the elastomeric material 163 since all torque is transmitted between the flywheel masses via the elastomeric material, it does provide vibration isolation in the drive path between flywheel masses 111 and 112 since arms 142A and 142B are only connected with flywheel mass 11 via elastomeric material 163.

Figure 12:
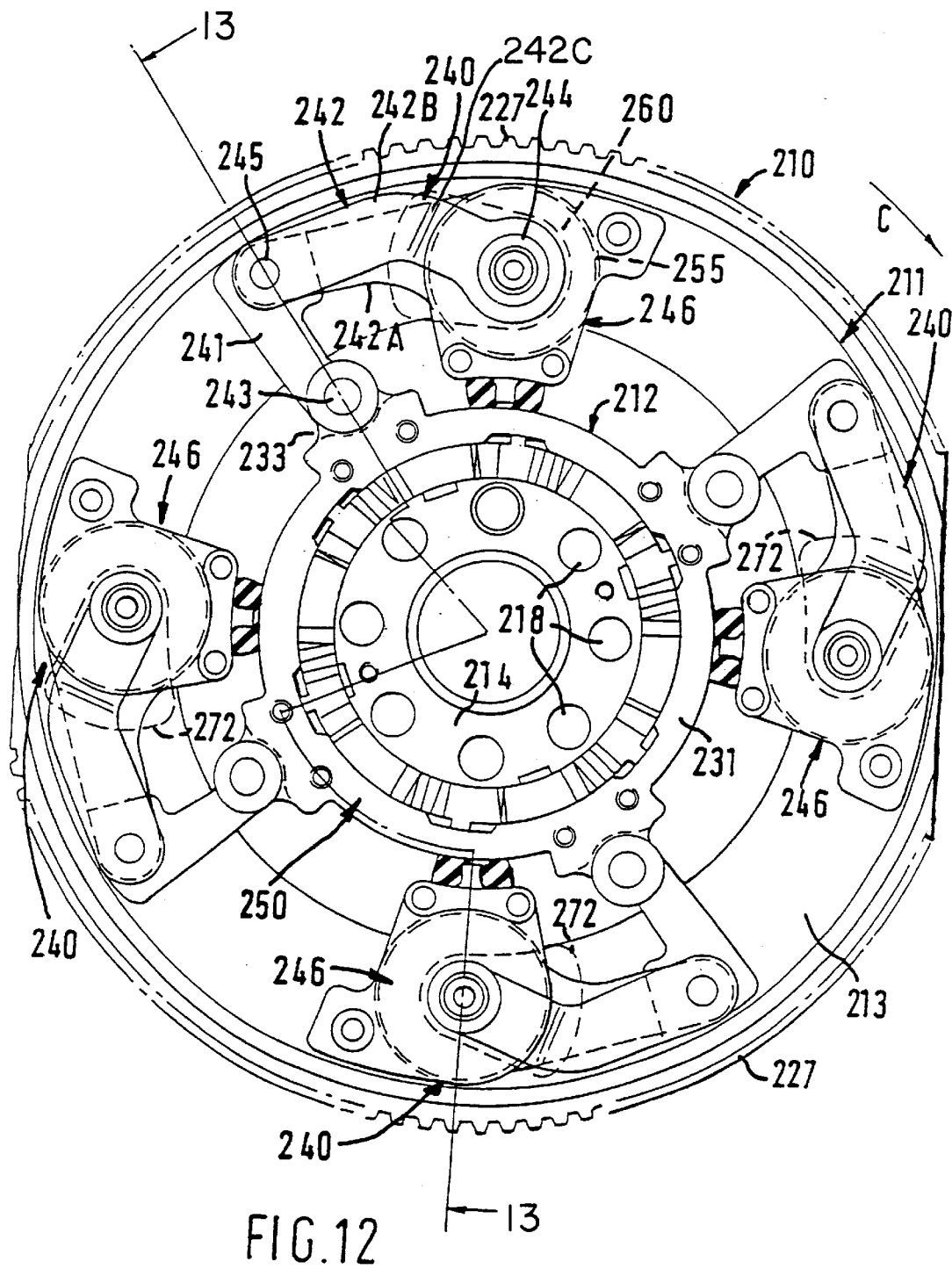
FIG. 12 is an axial cut-away view of a fourth embodiment of a twin mass flywheel according to the present invention taken in the direction D of FIG. 13.
Figure 13:
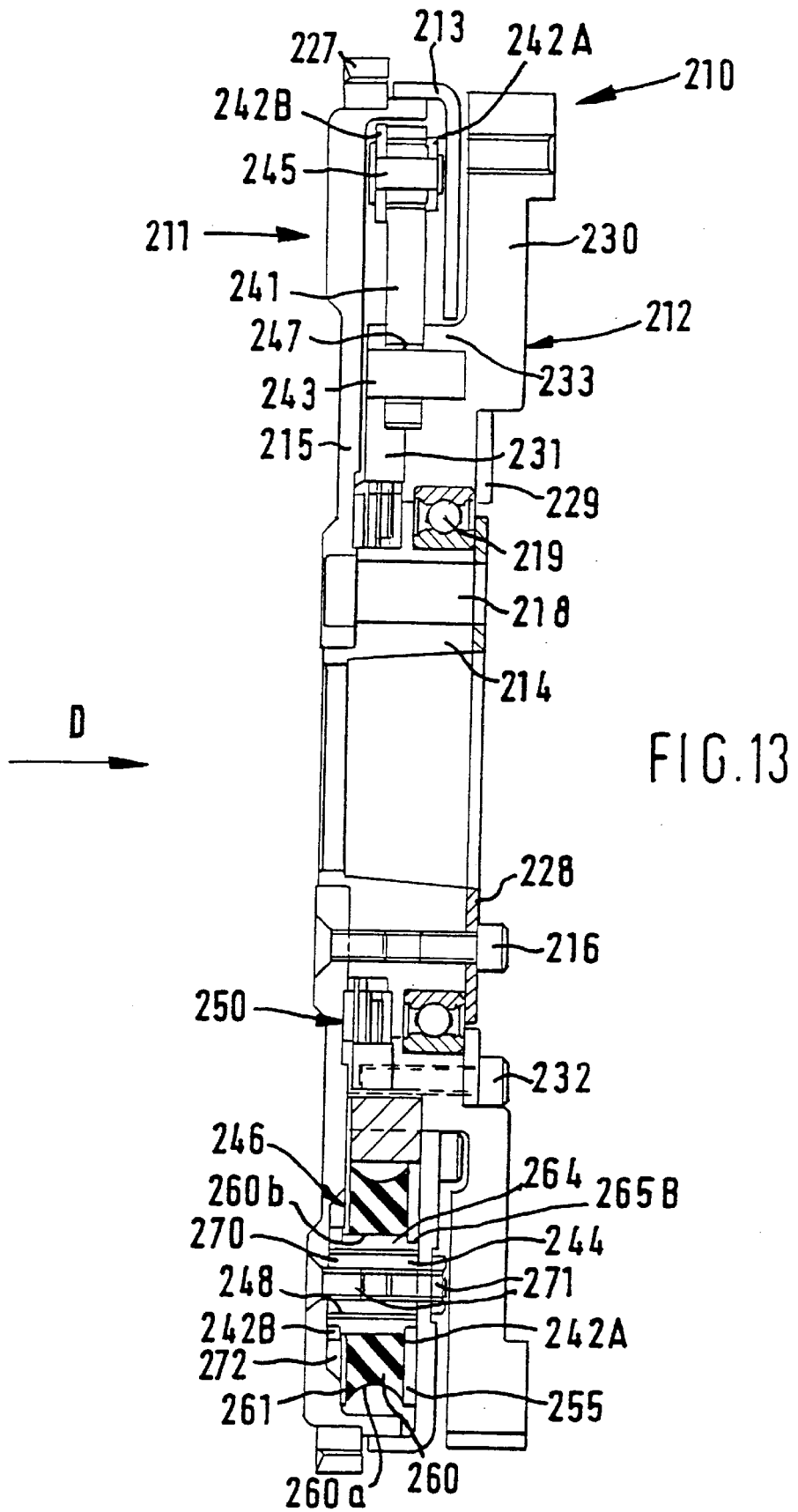
FIG. 13 is a radial cross section taken along the line 13—13 of FIG. 12.
Figure 14:
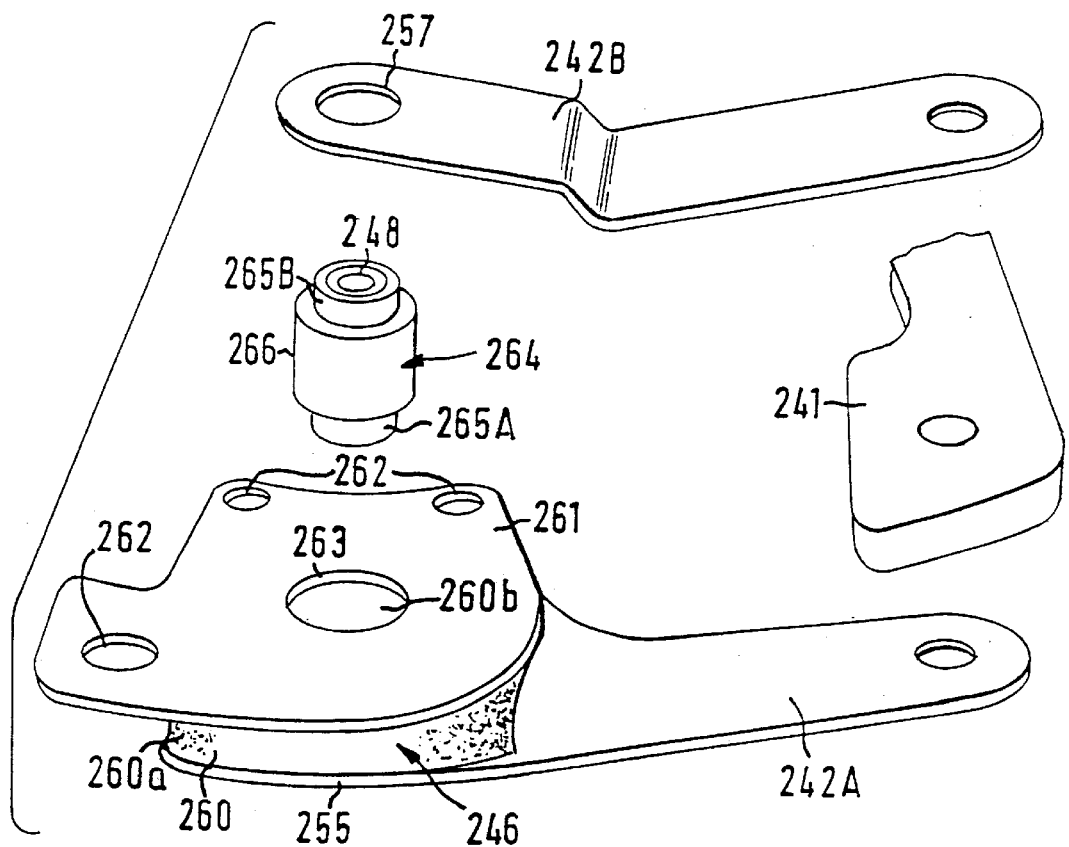
FIG. 14 is an isometric exploded view of a torsion unit (as used in the flywheel of FIGS. 12 and 13) and adjacent components.

With reference to FIGS. 12 to 14 of the accompanying drawings there is illustrated a further form of twin mass flywheel 210 which is divided into two flywheel masses 211 and 212. One flywheel mass 211 is fixed on a crankshaft (not shown) of an internal combustion engine by way of a central hub 214 and bolts (not shown) which pass through holes 218. In use a friction clutch (not shown) is secured to the second flywheel mass 212. Under normal drive and overrun conditions the twin mass flywheel 210 rotates in a clockwise direction as viewed in FIG. 12 as indicated by arrow C.

The flywheel mass 211 comprises the central hub 214, a main housing plate 215, a cover plate 213 and a starter ring 227 which is welded to main housing plate 215. An inner bearing retaining plate 228 is fixed to the hub 214 by bolts 216 to retain a bearing 219 on which the second flywheel mass 212 is mounted.

The second flywheel mass 212 comprises a flywheel plate 230 with an outer bearing retaining plate 229 and a pivot plate 231 both fixed to the flywheel plate 230 by bolts 232.

Relative rotation between the two flywheel masses 211 and 212 is controlled by a plurality of pivotal linkages 240, resilient means in the form of a plurality of torsion units 246, and a friction damping means 250.

Each pivotal linkage 240 comprises a first link 241 pivotally mounted between a centre hub portion 233 of the flywheel mass 212 and pivot plate 231 on a plain bearing 247 by way of a first pivot 243 and a second link 242 pivotally mounted on the flywheel mass 211 by way of second pivot 244 associated with torsion unit 246. The two links 241 and 242 are pivotally connected to each other by means of a third pivot 245. It will be noted from FIG. 12 that the first pivot 243 is positioned radially inwardly of the second and third pivots 244 and 245. The first link 241 is formed as a bob weight mass having a greater mass at its end remote from the pivot 243. The second link 242 comprises a pair of arms 242A, 242B (see FIG. 14) which are axially spaced one on each side of the link 241. Arm 242A has a disc-shaped portion 255 on one axial end and one end of arm 242B is axially displaced relative to the other end to ensure clearance between the arm 242B and various other components in the twin mass flywheel 210.

Each torsion unit 246 (see FIG. 14) consists of an annular ring of elastomeric material 260 on one axial side of which is bonded the disc-shaped portion 255 of arm 242A and on the other axial side of which is bonded a plate 261 which includes fixing holes 262 and central hole 263. Bush 264 fits inside the torsion unit with one stepped axial end 265A being press fitted into a hole 256 in the disc shaped portion 255 of arm 242A. The other stepped axial end 265B of the bush 264 is a press fit in a hole 257 in arm 242B. The dimensions of larger diameter part 266 of the bush 264 ensure that arm 242B does not contact plate 261 and the bush 264 does not contact the edge of the hole 263. Bush 264 has an axial hole in which is fixed a low friction bearing 248 in the form of a steel backed PTFE lined bush. This bearing runs on a sleeve 270 which is fixed rotationally fast between main housing plate 215 and cover plate 213 by bolts 271. Thus bolts 271 and sleeve 270 form the stationary part of pivot 244 and bearing 248 and bush 264 from the rotating part of pivot 244. Plate 261 is fixed, via bolts (not shown) which pass through fixing holes 262, to main housing plate 215.

A further form of resilient means may have a profiled plate bonded to the elastomeric material and a profiled arm fixed to the plate with the profiled plate and profiled arm replacing the arm 242A.

Main housing plate 215 has recesses 272 (the position of which is shown dotted in FIG. 12) which ensure no contact between the arms 242B and plate 215 during relative rotation of flywheel masses 211 and 212.

Friction damping means 250 is a multi-plate friction damping device similar to friction damping means 50 described with reference to FIG. 1 and will not therefore be further described here.

The operation of the twin mass flywheel 210 is similar to the operation of the twin mass flywheel 10 of FIG. 1 but note that flywheel 210 rotates clockwise as indicated by arrow C and when power is transmitted in the drive direction flywheel mass 211 rotates clockwise relative to flywheel mass 212 and vice versa when power is transmitted in the over-run direction. In summary, relative rotation of flywheel masses 211 and 212 will cause arms 242A and 242B which has an axial joggle 242C of each linkage to rotate in unison about their respective pivot 244 thus causing a torsional deflection of the elastomeric material 260 of each torsion unit 246.

It will be noted that the elastomeric material 260 has a first surface bonded to the arm 242 and a second surface bonded to the plate 261 of its respective torsion unit. Plate 261 is fast with flywheel mass 211 which controls the relative rotation of the flywheel masses.

Since the first and second bonded surfaces of the elastomeric material are axially separated, when the arm 242A rotates relative to the plate 261 the elastomeric material 260 undergoes axial shear ie. the first and second bonded surfaces which rotate relative to each other are spaced axially apart. Contrast this with the torsion unit 46 in which the elastomeric material 63 undergoes radial shear as hereinbefore defined.

It will further be noted that the elastomeric material 260 has two annular free surfaces 260a, 260b which do not contact any part of the twin mass flywheel. Free surface 260a is concave in cross section which reduces the stresses in the elastomeric material locally when compared with the average stress to ensure the elastomeric material does not peel away at its bonded surface.

Free surface 260b is straight in cross section, however since the elastomeric material is bonded between surfaces which are parallel (plate 261 and disc shaped portion 255) the stresses in the elastomeric material local to free surface 260b are automatically less than the average stress because, per degree of relative rotation of the bonded surfaces, the radially inner portions of elastomeric material at the free surface 260b are required to stretch less than radially outer portions of the elastomeric material.

Figure 15:
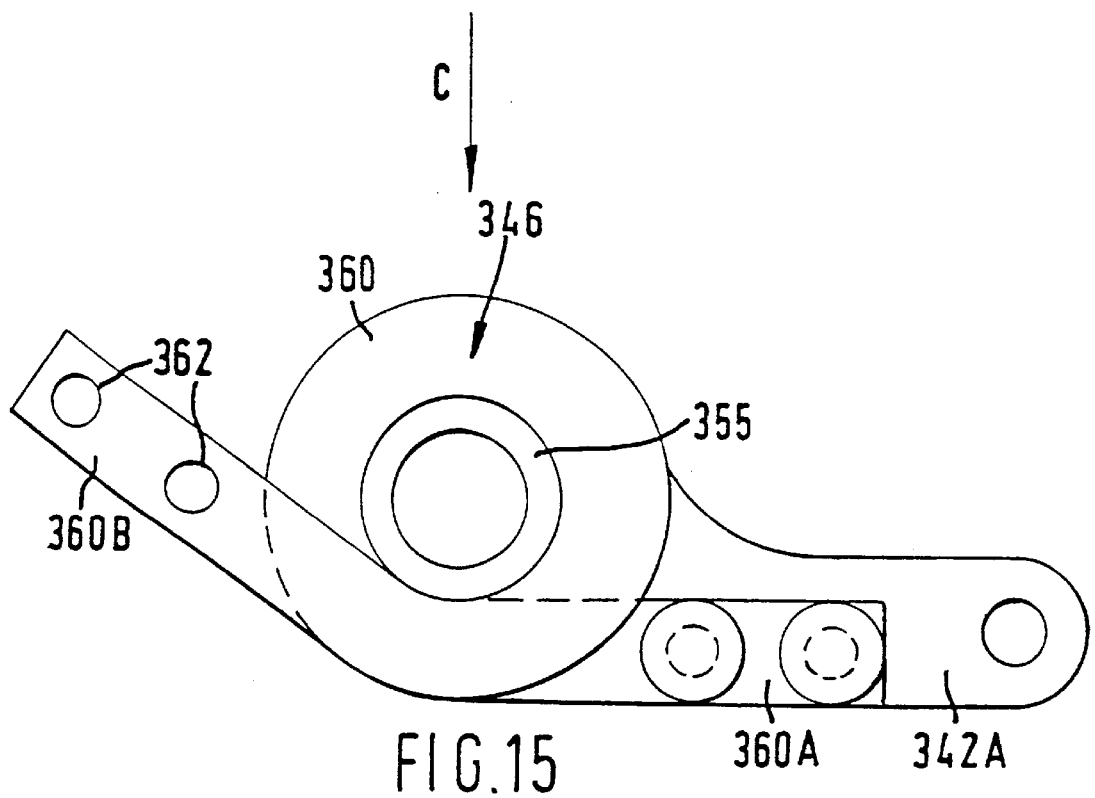
FIG. 15 is an axial view of a further form of a torsion unit capable of use in the flywheel of FIGS. 12 and 13.
Figure 16:
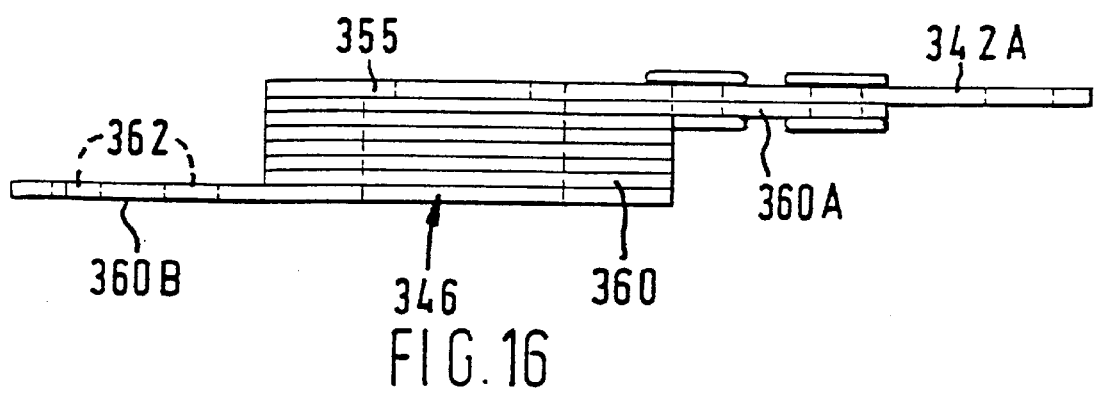
FIG. 16 is a view of the torsion unit of FIG. 15 taken in the direction of arrow C.

With reference to FIGS. 15 and 16 there is shown a further form of torsion unit 346 which consists of a torsion spring 360 wound in a coil with spring ends 360A and 360B. Spring end 360A is fixed via rivets to a disc shaped portion 355 of arm 342A.

Torsion units 346 can be fitted to twin mass flywheel 210 in place of torsion units 246 with fixing holes 362 of spring end 360B being used to secure spring end 360B to the main housing plate 215 via bolts or rivets. Note bush 264 and arm 242B will still be required for each torsion unit 346.

It will be appreciated that the torsion spring 360 undergoes axial torsion ie. the torsion loading is imposed by the relative rotation of components (spring ends 360A and 360B) which are spaced axially from each other relative to their axis of rotation. An alternative design may put a torsion spring wound in a spiral (eg. a watch type spring) into radial torsion, ie. the torsion loading nay be imposed by the relative rotation of components which are spaced radially from each other relative to their axis of rotation.

Figure 17:
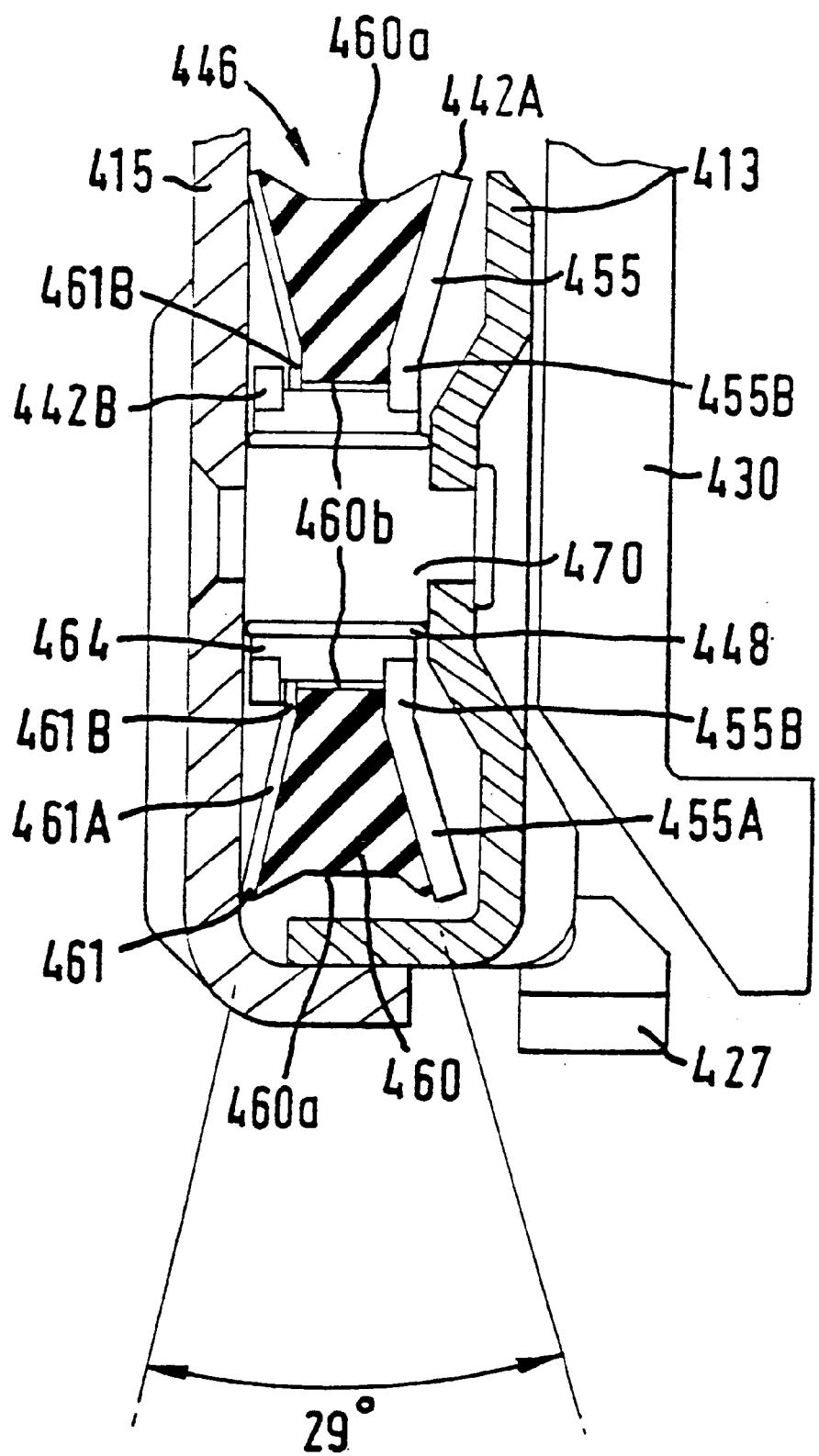
FIG. 17 is a radial cross section of a still further form of a torsion unit capable of use in the flywheel of FIGS. 12 and 13.

FIG. 17 shows a modified further form of torsion unit 446 in which the elastomeric material 460 is bonded to dished portions 461A and 455A of plate 461 and arm 442A respectively. The radially inner portions 461B and 455B of plate 461 and arm 442A are spaced closer together than the radially outer portions 461A and 455A. This enables a more compact design with more even loading of the elastomeric material and an increase in service life. Note components which fulfil the same function as equivalent components in the twin mass flywheel 210 are numbered 200 greater with rivet 470 replacing sleeve 270 and bolts 271.

It should also be noted that the free surface 460a is concave in cross section to locally reduce the stresses in a similar way to free surface 260a.

The plate 461 and arm 442A have short portions 461B and 455B respectively which are parallel, i.e. the angle between the bonded surfaces of the elastomeric material at a radially inner portion (in this case zero degrees) is smaller than the angle between the bonded surfaces of the elastomeric material at a radially outer portion (in this case 29 degrees). Over this parallel section the stresses in the elastomeric material decrease towards the axis of the torsion unit in a similar manner to the stresses in the elastomeric material 260. Thus the stresses in the elastomeric material 460 local to the free surfaces 460B are lower than the average stress.

Figure 19:
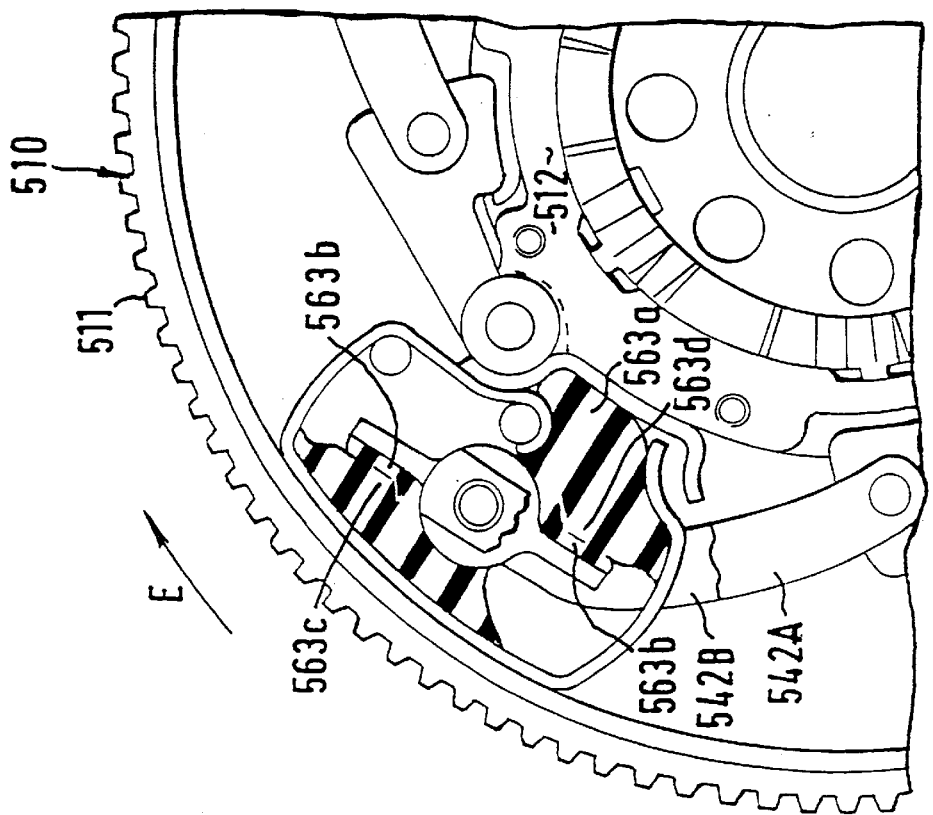
FIG. 19 shows the twin mass flywheel of FIG. 18 in the full drive position.
Figure 18:
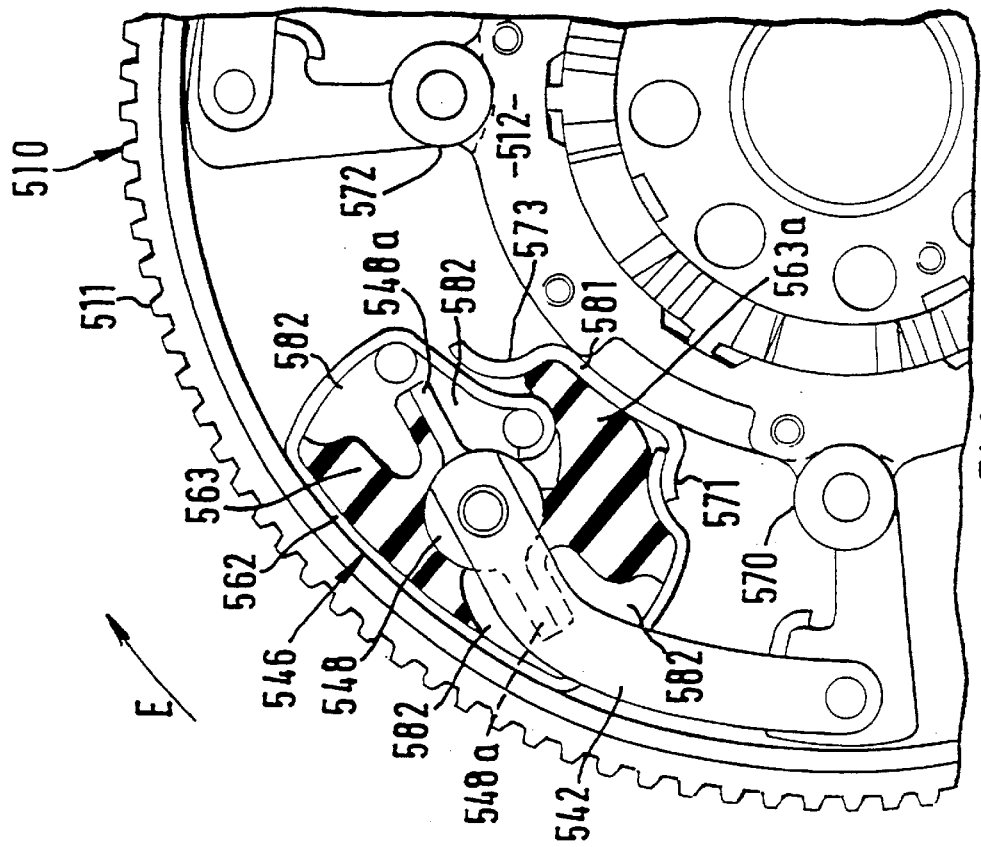
FIG. 18 is a partial axial cut-away view of a twin mass flywheel in the geometrically neutral position, including a third further form of torsion unit.
Figure 20:
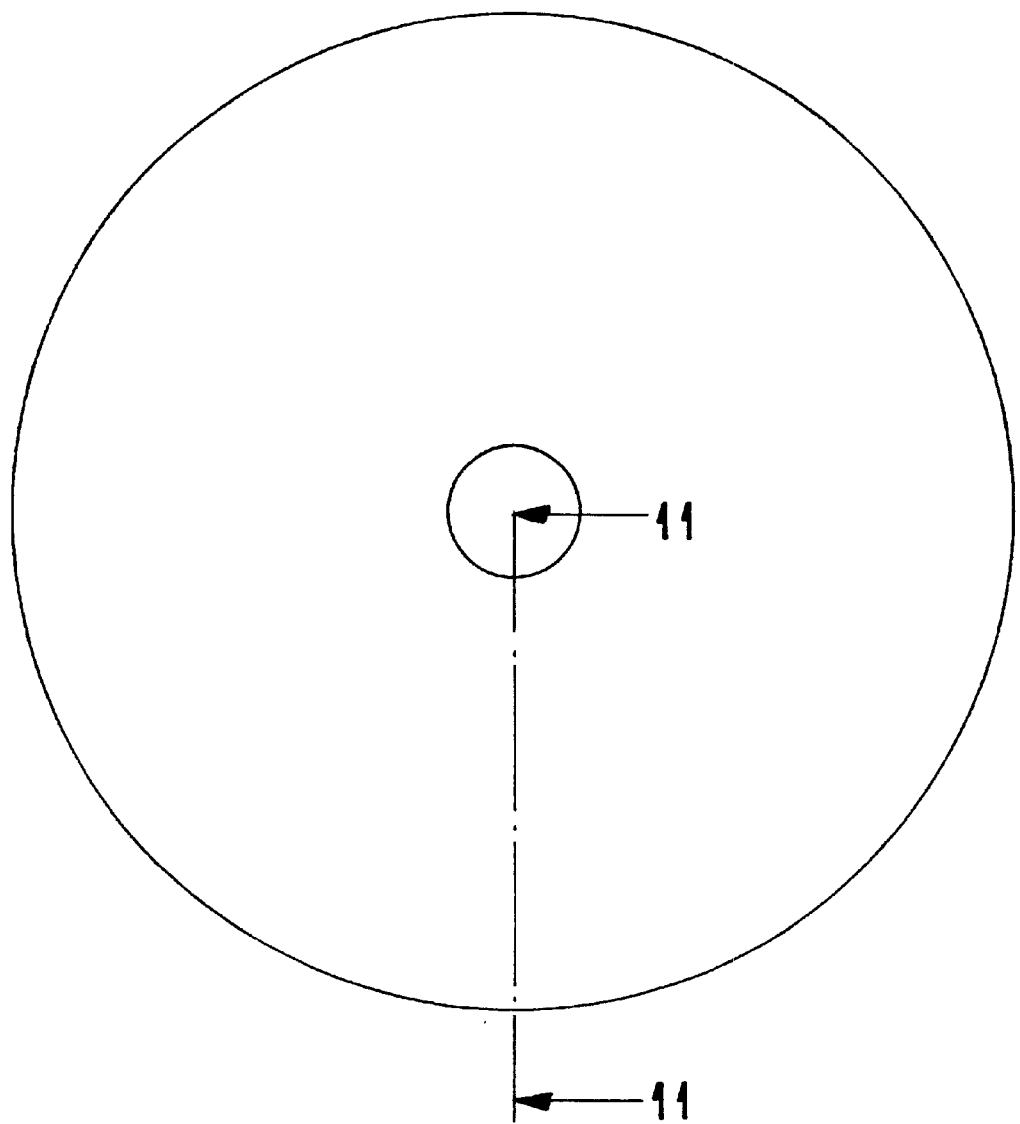
FIG. 20 is a diagrammatic view taken in the direction of arrow F of FIG. 11 of a third embodiment of a twin mass flywheel.

FIGS. 18 and 19 show an alternative from of torsion unit 546, with components which fulfil the same function as equivalent components in the twin mass flywheel 10 of FIG. 1 being numbered 500 greater.

It will be noted that:
a) the twin mass flywheel 510 rotates in a clockwise direction as indicated by arrow E of FIGS. 18 and 19;
b) the insert 548 has two paddles 548a;
c) the space between the housing 562 and insert has voids 582;
d) the housing 562 has an opening through which projects a portion 536a of elastomeric material; and
e) a shoe 581 is provided which can rotate to a limited extent relative to both flywheel masses.

Operation of the twin mass flywheel is similar to the operation of twin mass flywheel 10.

The elastomeric material resists small amounts of relative rotation of the flywheel masses about the geometrically neutral position in the drive or over-run directions, by radial shear.

Larger amounts of relative rotation in the drive or over-run directions will cause further shear and cause portion 563b to contact elastomeric portions 563c and 563d (see FIG. 19) putting all these portions into compression.

Also the compression of portion 563d causes (via compression of portion 563a) the shoe 571 to be pressed into engagement with and to generate friction with a portion of the flywheel mass 512.

The compression deformation of portions 563b and 563d combined with the friction generated at shoe 581 has the effect of increasing the torque required to rotate the flywheel masses after a predetermined amount of relative rotation.

FIG. 19 shows the twin mass flywheel in the full drive position (i.e. against its and stops in the drive direction) and it will be noted that in this position the shoe 581 has been pushed by abutment 572 and rotated relative to flywheel 511 to further compress portion 563 when compared with the full over-run position (not shown) to generate further resistance to relative rotation of the flywheel masses.

In further modification of the construction shown in FIGS. 18 and 19 a shoe could be arranged to further compress a portion of the elastomeric material at the full over-run position. Alternatively a shoe need not further compress any portion of elastomeric material at the full drive or over-run position.

It will be appreciated that the embodiments of torsion units shown in FIGS. 12 to 17 all undergo axial shear and the torsion unit shown in FIGS. 18 and 19 undergoes radial shear. All these torsion units can readily be substituted in place of torsion unit 46 and can readily be designed to give any of the example characteristics shown in FIG. 4 or other torsion unit characteristics not shown.

Figure 9:
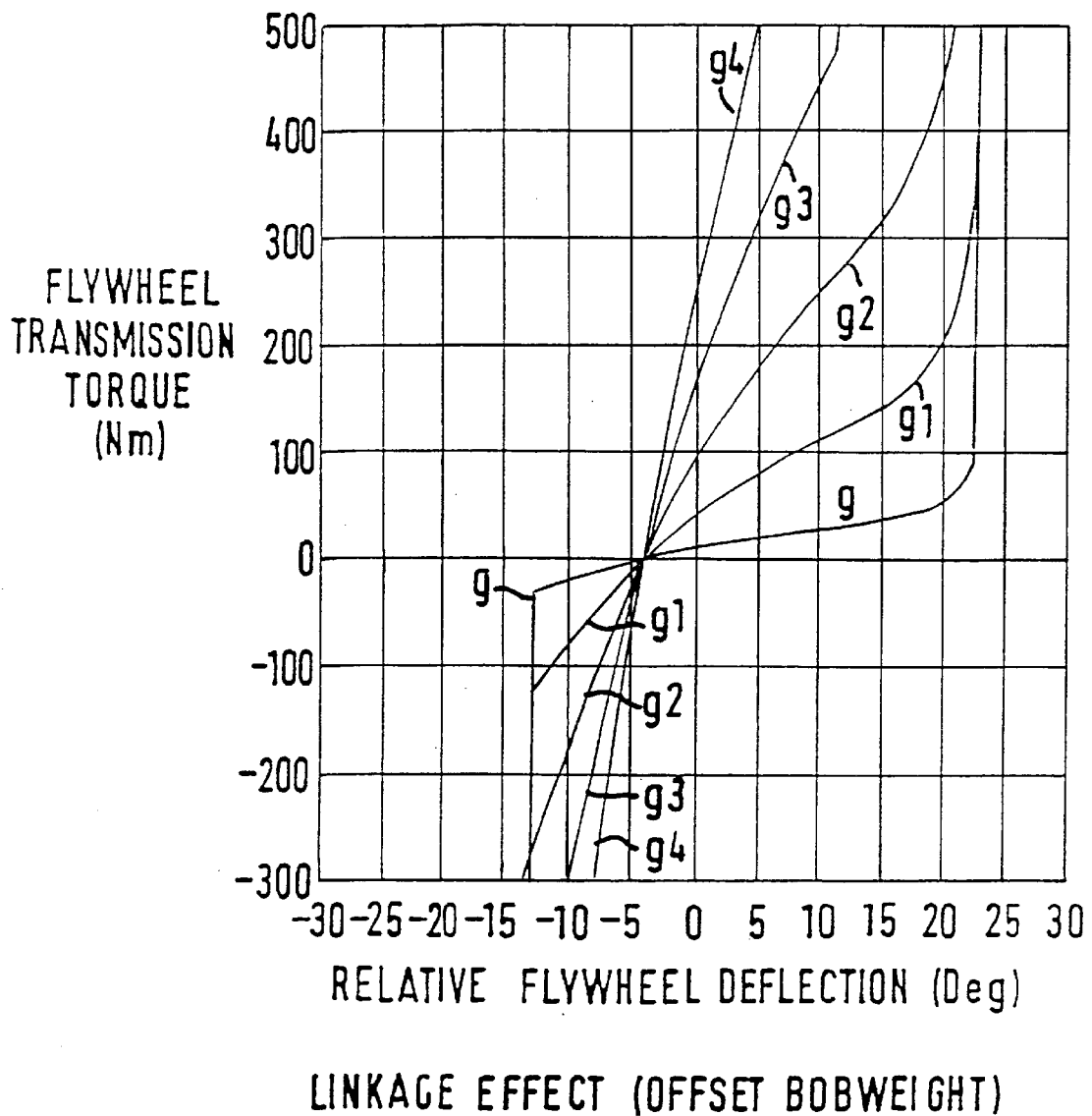
FIG. 9 illustrates relative flywheel deflection Versus flywheel transmission torque characteristics of the linkage used in the twin mass flywheel of FIG. 8 for different rotational speeds (G, G1, G2, G3, G4 represent flywheel rotational speeds of 800, 1600, 2400, 3200 and 4000 rpm respectively)
Figure 10:
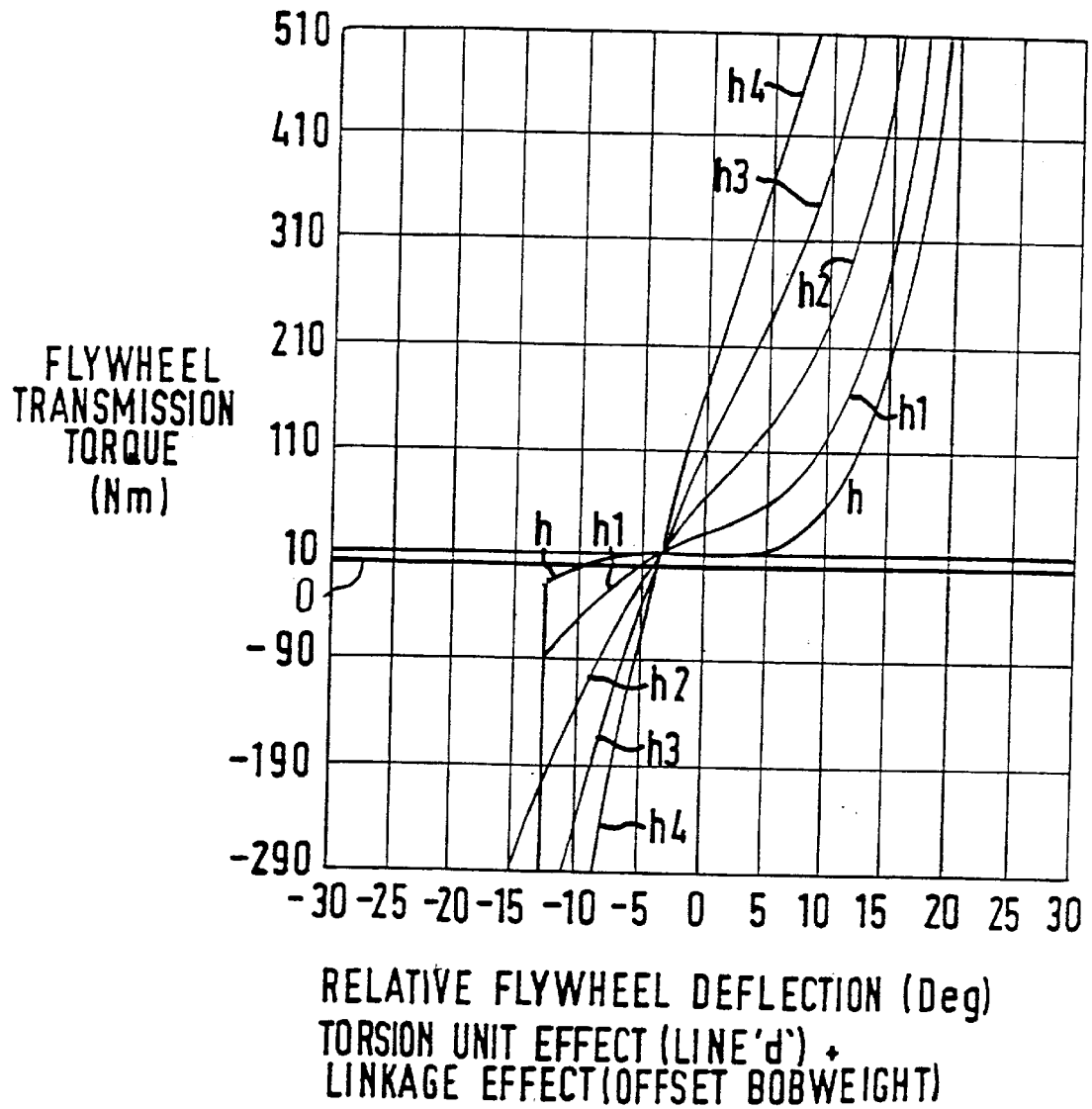
FIG. 10 illustrates relative deflections Versus flywheel transmission torque characteristics for different rotational speeds of the twin mass flywheel of FIG. 8 (H, H1, H2, H3, H4, represent flywheel rotational speeds of 800, 1600, 2400, 3200 and 4000 rpm respectively)

It will be apparent that any of the torsion unit characteristics of FIG. 4 (or any other torsion unit characteristics not shown) can be combined with any of the linkage characteristics of FIGS. 5 and 9 (or any other linkage characteristics not shown) and any drive end stop position and any overrun end stop position to provide a flywheel characteristic suitable for a particular application.

We claim:

1. A twin mass flywheel (10) comprising two co-axially arranged flywheel masses (11,12) which are mounted for limited angular rotation relative to each other; and a plurality of pivotal linkages (40) interconnecting the two flywheel masses, each linkage comprising a first link (41) pivotally connected via a first pivot (43) to one (12) of the flywheel masses, a second link (42) pivotally connected via a second pivot (44) to the other (11) of the flywheel masses, and a third pivot (45) for pivotally connecting the first and second links, each pivotal linkage being capable of adopting a geometrically neutral position in which the third pivot (45) and the first or second pivot (43,44) can become aligned on a radial plane of the twin mass flywheel (10); and a resilient means (46) which encircles the first or second pivot for controlling the relative rotation of said flywheel masses (11,12).

2. A twin mass flywheel as defined in claim 1 in which the resilient means is an elastomeric material (63).

3. A twin mass flywheel as defined in claim 1 in which the resilient means is a spring (360).

4. A twin mass flywheel as defined in claim 1 in which the resilient means (46) acts in torsion.

5. A twin mass flywheel as claimed in claim 1 in which during relative rotation of the two flywheel masses (11,12) the pivot (43) of each first link (41) with its associated flywheel mass (12), the pivot (45) which pivotally connects each corresponding first and second links, and a radial plane of the twin mass flywheel can become aligned and the resilient means (46) is associated with the pivot (44) of each second link (42) with its associated flywheel mass (11).

6. A twin mass flywheel as defined in claim 1 in which the resilient means comprises a plurality of torsion units (46) each comprising an elastomeric material (63) bonded between two relatively rotatable elements (48,62).

7. A twin mass flywheel as defined in claim 6 in which the relatively rotatable elements (255,261) are spaced axially having regard to the axis of rotation of the associated pivotal connection so that the elastomeric material undergoes axial shear during relative rotation of the flywheel masses.

8. A twin mass flywheel as defined in claim 6 in which one relatively rotatable element (255) forms part of the associated first or second link (242A).

9. A twin mass flywheel as defined in claim 6 in which one relatively rotatable element (250) contacts co-operating abutments (265A) on part of the associated pivotal connection (264) to enable the said one element to rotate about the axis of the associated pivotal connection.

10. A twin mass flywheel as defined in claim 7 in which the two surfaces of the elastomeric material (460) which are bonded to the relatively rotative elements (455,461) are spaced closer together at a radially inner portion of the elastomeric material than at a radially outer portion thereof.

11. A twin mass flywheel as defined in claim 10 in which the stresses imposed in the region of a free surface (460a, 460b) of the elastomeric material (460) are reduced when compared with the average stresses in the elastomeric material to reduce the tendency of the elastomeric material to peel from the elements (455,461) at the free surface.

12. A twin mass flywheel as defined in claim 11 in which the angle between the bonded surfaces of the elastomeric material (460) at a radially inner portion (461B,455B) is smaller than the angle between the bonded surfaces of the elastomeric material at a radially outer portion (461A, 455A).

13. A twin mass flywheel as defined in claim 1 in which with each linkage (40) is in its geometrically neutral position, that is with the pivotal connection of each link (41) with its associated flywheel (12) and the respective pivot (45) which connects the links aligned with a radial plane of the twin mass flywheel (10), the resilient means (46) does not bias its associated link (42) in either rotational direction.

14. A twin mass flywheel as defined in claim 1 in which when each linkage (40) in its geometrically neutral position the resilient means (46) biases its associated link (42) in one rotational direction.

15. A twin mass flywheel as defined in claim 1 in which with each linkage (40) in its geometrically neutral position the resilient means (46) biases its associated link (42) in the other rotational direction.

16. A twin mass flywheel as defined in any earlier claim 1 in which the centrifugally neutral position of each linkage (140), that is the position adopted by the linkage with the flywheel is rotating and not transmitting any torque and the relative rotation of the flywheel masses (111,112) is not being restricted by either drive or overrun end stops, is not the same as the geometrically neutral position.

17. A twin mass flywheel as defined in claim 1 in which with each linkage (140) in its centrifugally neutral position, the resilient means (146) does not bias its associated link in either rotational direction.

18. A twin mass flywheel as defined in claim 1 in which with each linkage (140) in its centrifugally neutral position, the resilient means (146) biases its associated link in one rotational direction.

19. A twin mass flywheel as defined in claim 1 in which with each linkage (140) in its centrifugally neutral position, the resilient means (146) biases its associated link in the other rotational direction.

20. A twin mass flywheel as defined in claim 1 in which a predetermined amount of relative rotation occurs between the flywheel masses (11,12) prior to the resilient means (46) controlling said relative rotation.

21. A twin mass flywheel as defined in claim 1 in which there are a plurality of resilient means (46) each having the same control characteristics.

22. A twin mass flywheel as defined in claim 1 in which there is a plurality of resilient means (46) which do not all have the same control characteristics.

23. A twin mass flywheel as defined in claim 1 in which one flywheel mass (11) is formed from a main housing (15) which is axially spaced from a cover plate (13) and clamped thereto by a plurality of fasteners (49) which each act as part of the pivotal connection (44) of either the first (41) or second link (42) of a linkage (40).

24. A twin mass flywheel as defined in claim 1 in which one flywheel mass (11) is formed from a main housing (15) which is axially spaced from a cover plate (13) and is clamped thereto by a plurality of fasteners (64) which each secure an associated torsion unit (46) between the main housing and cover plate.

25. A twin mass flywheel as defined in claim 1 in which some links (41,242B) have an axial joggle (418, 242C) to provide an axially compact twin mass flywheel.

26. A twin mass flywheel as defined in claim 1 in which first abutments (71,73) operatively connected to one flywheel mass (11) contact second abutments (70,72) operatively connected to the other flywheel mass (12) to provide an end stop function so that torque can be transmitted directly between the masses at the limit of the relative rotation.

27. A twin mass flywheel as defined in claim 26 in which contact between said first and second abutments (71,73;70, 72) occurs without to the axes of the pivot (45) and the two pivotal connections (43,44) of the links (41,42) becoming aligned.

* * * * *